US011868077B2

(12) United States Patent
Adachi et al.

(10) Patent No.: US 11,868,077 B2
(45) Date of Patent: Jan. 9, 2024

(54) IMAGE FORMING APPARATUS

(71) Applicant: BROTHER KOGYO KABUSHIKI KAISHA, Nagoya (JP)

(72) Inventors: Aya Adachi, Kasugai (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/051,660

(22) Filed: Nov. 1, 2022

(65) Prior Publication Data

US 2023/0137161 A1 May 4, 2023

(30) Foreign Application Priority Data

Nov. 4, 2021 (JP) ................................ 2021-180693

(51) Int. Cl.
G03G 21/12 (2006.01)

(52) U.S. Cl.
CPC .................................... G03G 21/12 (2013.01)

(58) Field of Classification Search
CPC .. G03G 21/105; G03G 21/12; G03G 21/1642; G03G 21/1676
See application file for complete search history.

(56) References Cited

U.S. PATENT DOCUMENTS 10,649,392 B2 * 5/2020 Sato .................. G03G 21/1676
2006/0104663 A1 5/2006 Kitozaki
2015/0078796 A1 * 3/2015 Sadamitsu ............ G03G 21/12 399/359
2016/0291527 A1 * 10/2016 Hashimoto .......... G03G 21/105

FOREIGN PATENT DOCUMENTS

JP 2006-139110 A 6/2006
JP 2017-40823 A 2/2017
JP 2020-86309 A 6/2020

* cited by examiner

Primary Examiner — Hoang X Ngo
(74) Attorney, Agent, or Firm — Merchant & Gould P.C.

(57) ABSTRACT

An image forming apparatus includes a drawer, a first drum cartridge having a first shutter, a second drum cartridge having a second shutter and a shutter driving member. In a state in which the shutter driving member is positioned at a first positon, the first shutter is positioned at a first closed position at which a first discharging outlet of the first drum cartridge is close and the second shutter is positioned at the second closed position at which a second discharging outlet of the second drum cartridge is close. In a state in which the shutter driving member is positioned at the second position, the first shutter is positioned at a first open position at which the first discharging outlet is open and the second shutter is positioned at a second open position at which the second discharging outlet is open.

15 Claims, 16 Drawing Sheets

IMAGE FORMING APPARATUS

REFERENCE TO RELATED APPLICATIONS

The present application claims priority from Japanese Patent Application No. 2021-180693, which was filed on Nov. 4, 2021, the disclosure of which is herein incorporated by reference in its entirety.

BACKGROUND ART

The following disclosure relates to an image forming apparatus.

There has been known a conventional image forming apparatus including a process cartridge. The process cartridge includes a photoconductive drum, a cleaning member configured to remove transfer-remaining toner remained in the photoconductive drum, and a screw configured to convey the transfer-remaining toner removed from the photoconductive drum by the cleaning member.

DESCRIPTION

In the conventional image forming apparatus, the transfer-remaining toner conveyed by the screw falls to a lower side through a through hole and the transfer-remaining toner is conveyed to a collecting unit.

Here, in a case where a user removes the process cartridge from the image forming apparatus, there is a possibility that the transfer-remaining toner spills through the through hole of the process cartridge. It is possible to provide a shutter for closing the through hole, however, in this case, there is a possibility that the shutter is forgotten to be closed when the user removes the process cartridge from the image forming apparatus.

An aspect of the disclosure relates to an image forming apparatus capable of preventing waste toner from being fallen out of a first drum cartridge and a second drum cartridge in a case where the first drum cartridge and the second drum cartridge are removed from a drawer.

In one aspect of the disclosure, an image forming apparatus includes a body housing having an opening, a drawer movable through the opening between an accommodated position at which the drawer is accommodated in the body housing and a drawn position at which the drawer is drawn to a position outside the body housing, a first drum cartridge mountable on the drawer and including: a first photoconductive drum, a first drum cleaner configured to collect waste toner from the first photoconductive drum, a first discharging outlet through which the waste toner collected by the first drum cleaner is discharged, and a first shutter movable between a first closed position at which the first shutter closes the first discharging outlet and a first open position at which the first discharging outlet is open, a first toner cartridge mountable on the first drum cartridge and capable of storing toner which is to be supplied to the first photoconductive drum, a second drum cartridge mountable on the drawer and including: a second photoconductive drum, a second drum cleaner configured to collect waste toner from the second photoconductive drum, a second discharging outlet through which the waste toner collected by the second drum cleaner is discharged, and a second shutter movable between a second closed position at which the second shutter closes the second discharging outlet and a second open position at which the second discharging outlet is open, and a second toner cartridge mountable on the second drum cartridge and capable of storing toner which is to be supplied to the second photoconductive drum. The drawer includes a waste toner tube through which the waste toner is allowed to pass, the waste toner tube having (i) a first waste-toner-inlet through which the waste toner discharged from the first discharging outlet of the first drum cartridge mounted on the drawer is received and (ii) a second waste-toner-inlet through which the waste toner discharged from the second discharging outlet of the second drum cartridge mounted on the drawer is received, a shutter driving member movable with respect to the waste toner tube between a first position and a second position, the shutter driving member being positioned at the first position in at least a state in which the drawer is positioned at the drawn position, the shutter driving member causing the first shutter and the second shutter to move in accordance with a movement of the shutter driving member in the state in which the first drum cartridge and the second drum cartridge are mounted on the drawer. In a state in which the shutter driving member is positioned at the first positon, the first shutter is positioned at the first closed position and the second shutter is positioned at the second closed position. In a state in which the shutter driving member is positioned at the second position, the first shutter is positioned at the first open position and the second shutter is positioned at the second open position.

The objects, features, advantages, and technical and industrial significance of the present disclosure will be better understood by reading the following detailed description of the embodiments, when considered in connection with the accompanying drawings, in which.

Figure 15:
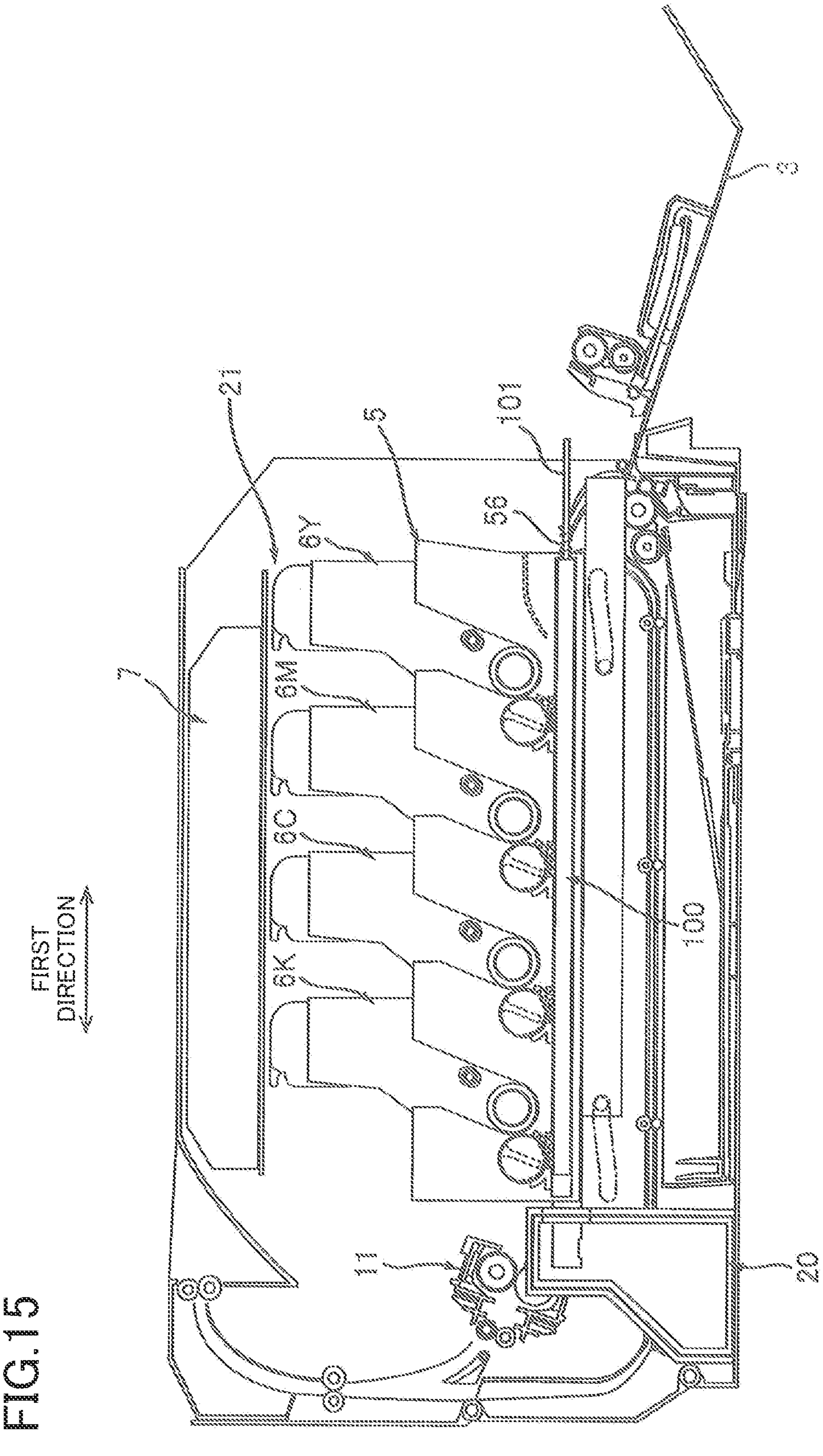
Figure 16:
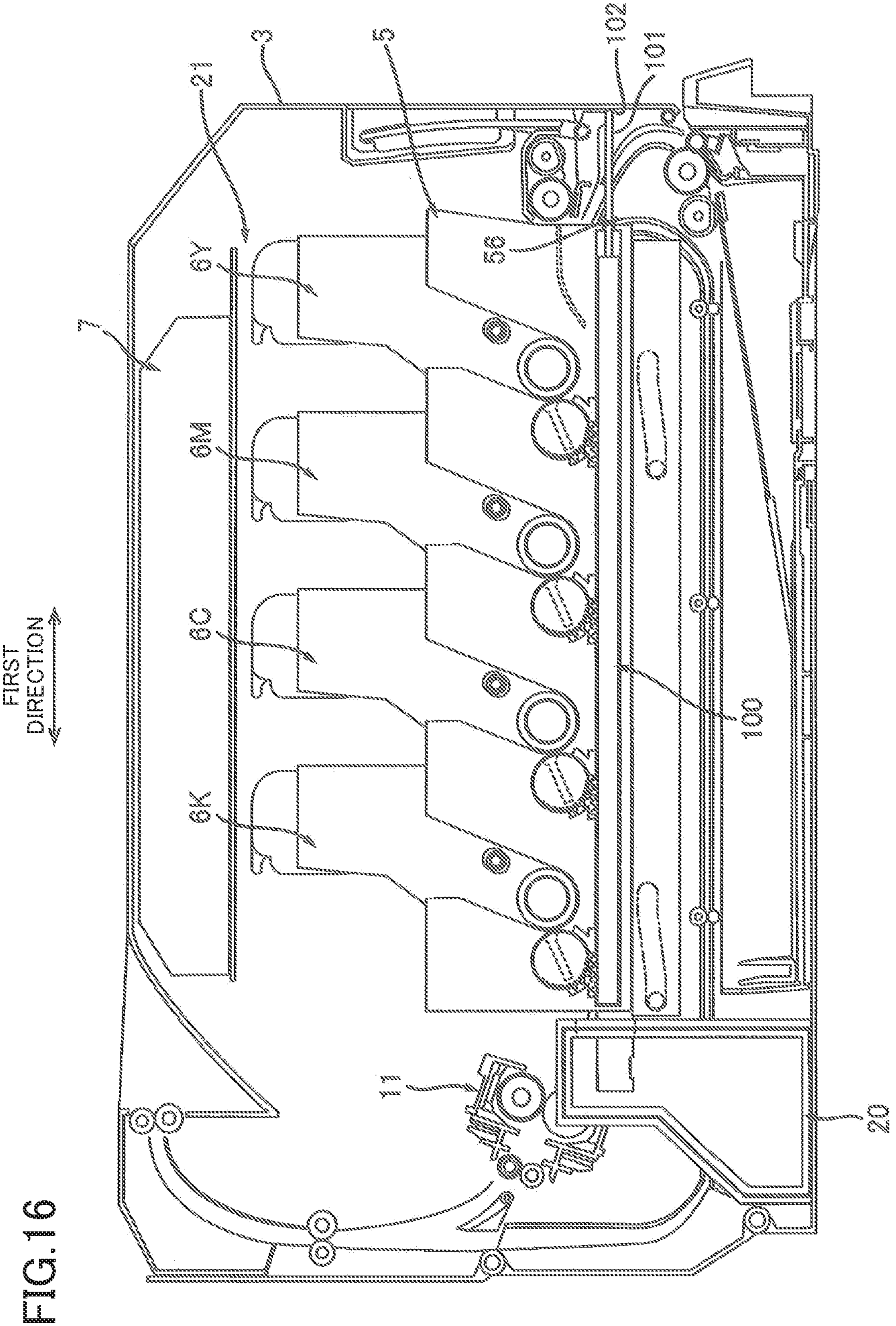

FIG. 15 is a view for explaining a modification and illustrating a state in which the drawer is positioned at the accommodated position, a cover is positioned at a cover open position and the shutter driving member is positioned at the first position; and FIG. 16 is a view illustrating a state in which the cover illustrated in FIG. 15 is positioned at a cover closed position and the shutter driving member is positioned at the second position.

OUTLINE OF IMAGE FORMING APPARATUS

There will be described a first embodiment of this disclosure in detail. An image forming apparatus 1 includes a body housing 2, a cover 3, a sheet tray 4, a drawer 5, a plurality of drum cartridges 6Y, 6M, 6C, 6K, a plurality of toner cartridges 7Y, 7M, 7C, 7K, an exposing unit 8, a belt unit 9, a transfer roller 10 and a fixing unit 11.

Body Housing

The body housing 2 accommodates the sheet tray 4, the drawer 5, the plurality of drum cartridges 6Y, 6M, 6C, 6K, the plurality of toner cartridges 7Y, 7M, 7C, 7K, the exposing unit 8, the belt unit 9, the transfer roller 10 and the fixing unit 11. The body housing 2 has an opening 21.

Cover

Figure 1:
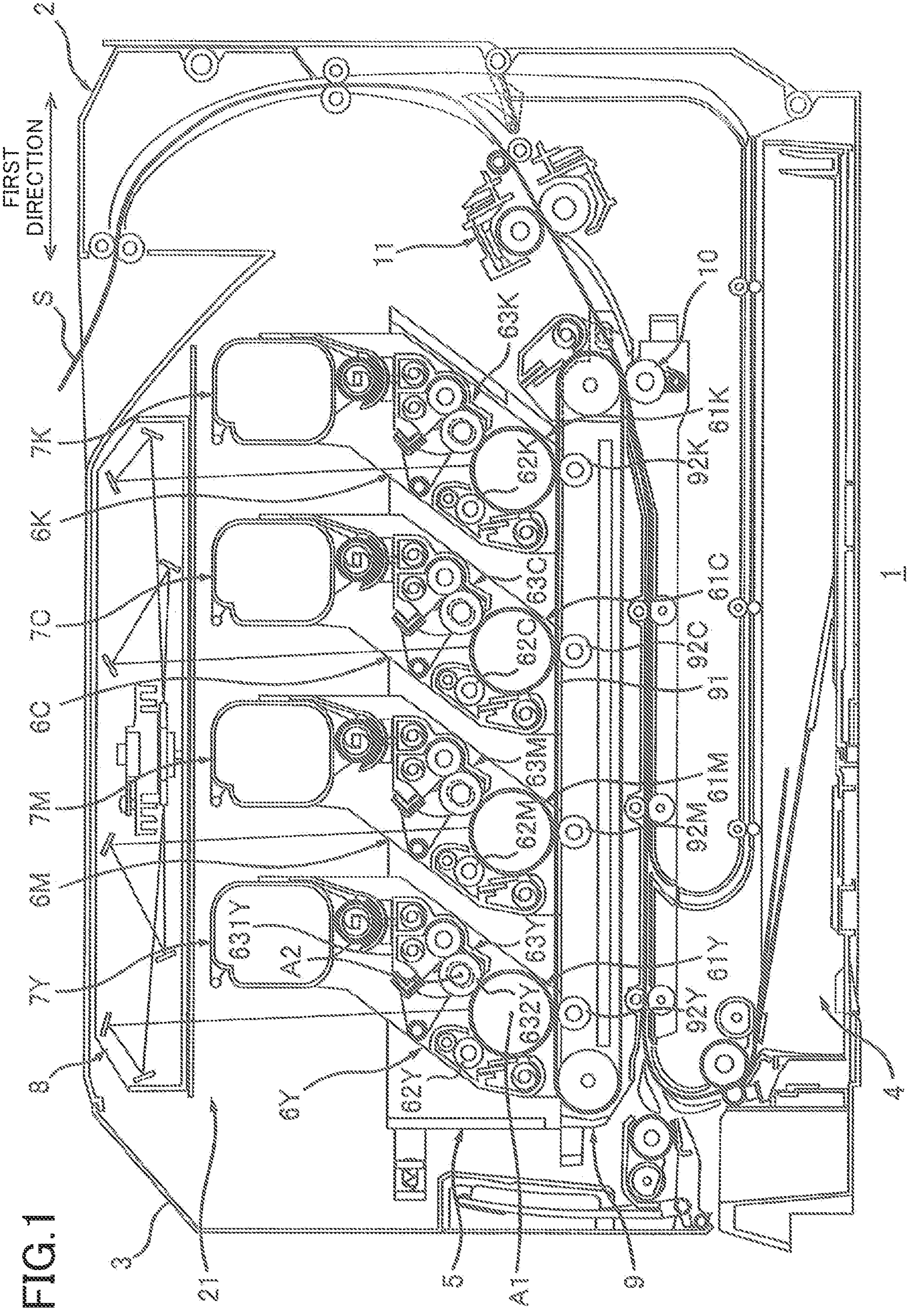
FIG. 1 is a schematic view illustrating a configuration of an image forming apparatus.
Figure 2:
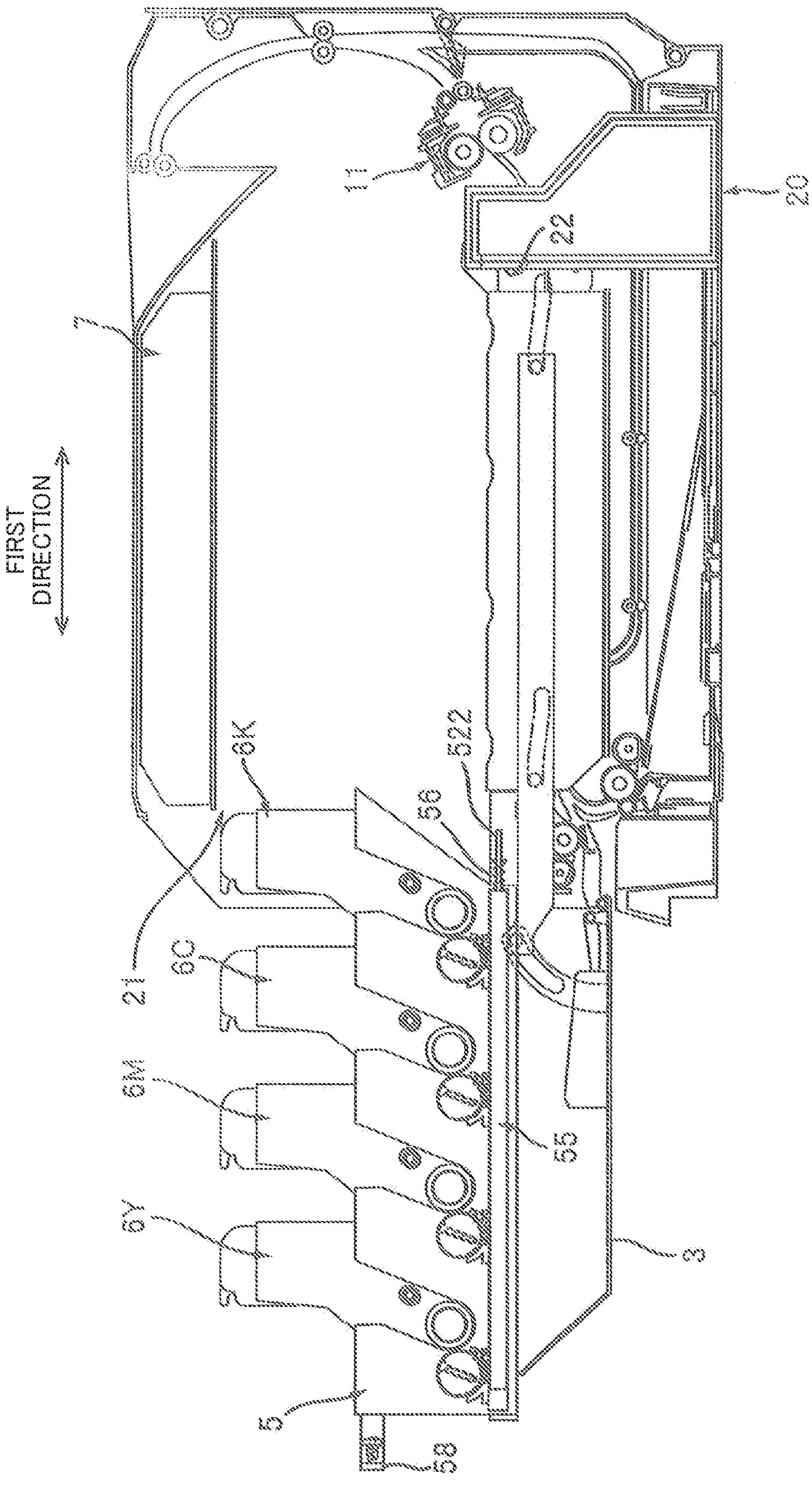
FIG. 2 is a view illustrating a state in which a drawer illustrated in FIG. 1 is positioned at a drawn position.

The cover 3 is movable between a cover closed position (see FIG. 1) and a cover open position (see FIG. 2). As illustrated in FIG. 1, in a state in which the cover 3 is positioned at the cover closed position, the cover 3 closes the opening 21. As illustrated in FIG. 2, in a state in which the cover 3 is positioned at the cover open position, the opening 21 is open.

Sheet Tray

As illustrated in FIG. 1, the sheet tray 4 is capable of storing a sheet S. The sheet Sin the sheet tray 4 is conveyed toward the transfer roller 10.

Drawer

As illustrated in FIG. 2, in the state in which the cover 3 is positioned at the cover open position, the drawer 5 is movable in a first direction through the opening 21 between an accommodated position (see FIG. 1) and a drawn position (see FIG. 2). As illustrated in FIG. 1, in a state in which the drawer 5 is positioned at the accommodated position, the whole drawer 5 is accommodated in the body housing 2. As illustrated in FIG. 2, in a state in which the drawer 5 is positioned at the drawn position, at least a part of the drawer 5 is drawn from the body housing 2 to a position outside of the body housing 2.

Drum Cartridges

As illustrated in FIG. 2, in the state in which the drawer 5 is positioned at the drawn position, each of the plurality of drum cartridges 6Y, 6M, 6C, 6K is mountable on the drawer 5. As illustrated in FIG. 1, in a state in which the plurality of drum cartridges 6Y, 6M, 6C, 6K are mounted on the drawer 5, a plurality of photoconductive drums 61Y, 61M, 61C, 61K are arranged in the first direction.

The drum cartridge 6Y includes the photoconductive drum 61Y, a charging unit 62Y and a developing unit 63Y. It is noted that each of the drum cartridges 6M, 6C, 6K has the same configuration as the drum cartridge 6Y. That is, the drum cartridge 6M includes the photoconductive drum 61M. An explanation of the drum cartridges 6M, 6C, 6K is dispensed with.

Photoconductive Drum

The photoconductive drum 61Y extends in a second direction. In a state in which the drum cartridge 6Y is mounted on the drawer 5, the second direction intersects the first direction. It is preferable that in the state in which the drum cartridge 6Y is mounted on the drawer 5, the second direction is orthogonal to the first direction. The photoconductive drum 61Y is rotatable around a drum axis A1. The drum axis A1 extends in the second direction.

Charging Unit

The charging unit 62Y charges a circumferential surface of the photoconductive drum 61Y. In the present embodiment, the charging unit 62Y is a charging roller. The charging unit 62Y may be a scorotron type charging unit.

Developing Unit

The developing unit 63Y is capable of supplying toner to the photoconductive drum 61Y. More specifically, the developing unit 63Y includes a developer housing 631Y and a developing roller 632Y.

The developer housing 631Y is capable of storing toner from the toner cartridge 7Y. The developer housing 631Y supports the developing roller 632Y.

The developing roller 632Y is capable of supplying toner in the developer housing 631Y to the photoconductive drum 61Y. The developing roller 632Y is in contact with the photoconductive drum 61Y. The developing roller 632Y may be capable of being spaced apart from the photoconductive drum 61Y. The developing roller 632Y extends in the second direction. The developing roller 632Y is rotatable around a developer axis A2. The developer axis A2 extends in the second direction.

Toner Cartridges

The toner cartridge 7Y is capable of storing toner which is to be supplied to the photoconductive drum 61Y. The toner cartridge 7Y is mountable on the drum cartridge 6Y. In a state in which the toner cartridge 7Y is mounted on the drum cartridge 6Y, the toner cartridge 7Y is capable of supplying toner to the developing unit 63Y.

The toner cartridge 7M is capable of storing toner which is to be supplied to the photoconductive drum 61M. The toner cartridge 7M is mountable on the drum cartridge 6M. In a state in which the toner cartridge 7M is mounted on the drum cartridge 6M, the toner cartridge 7M is capable of supplying toner to a developing unit 63M.

The toner cartridge 7C is capable of storing toner which is to be supplied to the photoconductive drum 61C. The toner cartridge 7C is mountable on the drum cartridge 6C. In a state in which the toner cartridge 7C is mounted on the drum cartridge 6C, the toner cartridge 7C is capable of supplying toner to a developing unit 63C.

The toner cartridge 7K is capable of storing toner which is to be supplied to the photoconductive drum 61K. The toner cartridge 7K is mountable on the drum cartridge 6K. In a state in which the toner cartridge 7K is mounted on the drum cartridge 6K, the toner cartridge 7K is capable of supplying toner to a developing unit 63K.

Exposing Unit

In a state in which the plurality of drum cartridges 6Y, 6M, 6C, 6K are mounted on the drawer 5 and the drawer 5 is positioned at the accommodated position, the exposing unit 8 is capable of exposing a circumferential surface of each of the plurality of photoconductive drums 61Y, 61M, 61C, 61K. In the present embodiment, the exposing unit 8 is a laser scanning unit.

Belt Unit

In the state in which the plurality of drum cartridges 6Y, 6M, 6C, 6K are mounted on the drawer 5 and the drawer 5 is positioned at the accommodated position, the belt unit 9 is located below the plurality of drum cartridges 6Y, 6M, 6C, 6K. The belt unit 9 includes an intermediate transfer belt 91 and a plurality of transfer rollers 92Y, 92M, 92C, 92K.

In the state in which the plurality of drum cartridges 6Y, 6M, 6C, 6K are mounted on the drawer 5 and the drawer 5 is positioned at the accommodated position, the intermediate transfer belt 91 is in contact with the plurality of photoconductive drums 61Y, 61M, 61C, 61K.

The transfer roller 92Y transfers toner on the photoconductive drum 61Y to the intermediate transfer belt 91. The transfer roller 92M transfers toner on the photoconductive drum 61M to the intermediate transfer belt 91. The transfer roller 92C transfers toner on the photoconductive drum 61C to the intermediate transfer belt 91. The transfer roller 92K transfers toner on the photoconductive drum 61K to the intermediate transfer belt 91.

Transfer Roller

The transfer roller 10 transfers toner on the intermediate transfer belt 91 to the sheet S. More specifically, the sheet S conveyed from the sheet tray 4 toward the transfer roller 10 is conveyed to the fixing unit 11 between the transfer roller 10 and the intermediate transfer belt 91. At this time, the transfer roller 10 transfers the toner on the intermediate transfer belt 91 to the sheet S.

Fixing Unit

The fixing unit 11 heats and presses the sheet S on which the toner is transferred, and fixes the toner onto the sheet S. The sheet S having passed through the fixing unit 11 is discharged to an upper surface of the body housing 2.

Details of Drum Cartridge

There will be described next the drum cartridge 6Y in detail with reference to FIG. 3 to FIG. 6.

Figure 3:
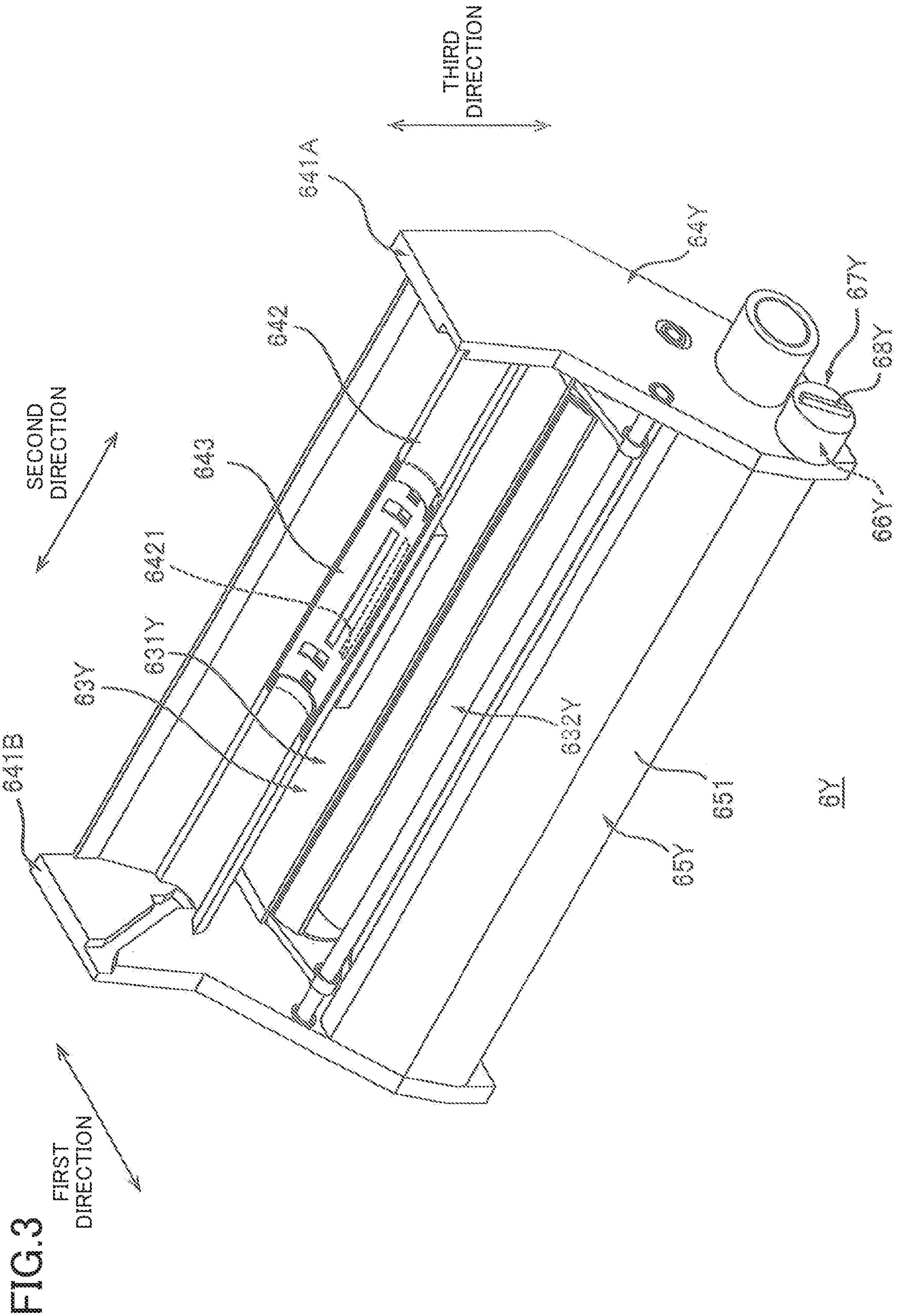
FIG. 3 is a perspective view of a drum cartridge illustrated in FIG. 1.

As illustrated in FIG. 3, the drum cartridge 6Y includes a drum frame 64Y, a drum cleaner 65Y, a waste toner discharge portion 66Y, a shutter 67Y and an engaging portion 68Y in addition to the above described the photoconductive drum 61Y (see FIG. 4), the charging unit 62Y (see FIG. 4) and the developing unit 63Y.

Drum Frame

The drum frame 64Y includes drum side plates 641A, 641B, a receiving portion 642 and a toner shutter 643.

Drum Side Plate

The drum side plate 641A is located at a first end of the drum cartridge 6Y in the second direction. The drum side plate 641A supports a first end of the photoconductive drum 61Y in the second direction and a first end of the developing unit 63Y in the second direction. In the state in which the toner cartridge 7Y is mounted on the drum cartridge 6Y, the drum side plate 641A supports a first end of the toner cartridge 7Y in the second direction. The drum side plate 641A extends in a third direction. The third direction intersects the first direction and the second direction. It is preferable that the third direction is orthogonal to the first direction and the second direction. In a state in which the drum cartridge 6Y is mounted on the image forming apparatus 1 and the image forming apparatus 1 is placed on a horizontal plane, the third direction is an up and down direction.

The drum side plate 641B is located at a second end of the drum cartridge 6Y in the second direction. The drum side plate 641B is spaced apart from the drum side plate 641A in the second direction. The drum side plate 641B supports a second end of the photoconductive drum 61Y in the second direction and a second end of the developing unit 63Y in the second direction. In the state in which the toner cartridge 7Y is mounted on the drum cartridge 6Y, the drum side plate 641A supports a second end of the toner cartridge 7Y in the second direction. The drum side plate 641B extends in the third direction.

Receiving Portion

In a state in which the toner cartridge 7Y is mounted on the drum cartridge 6Y, the receiving portion 642 receives the toner cartridge 7Y. The receiving portion 642 extends in the second direction. A first end of the receiving portion 642 in the second direction is connected to the drum side plate 641A. A second end of the receiving portion 642 in the second direction is connected to the drum side plate 641B. The receiving portion 642 includes a toner inlet 6421.

The toner inlet 6421 is located at a central part of the receiving portion 642 in the second direction. The toner inlet 6421 communicates with an inner space of the developer housing 631Y.

Toner Shutter

The toner shutter 643 is attached to the receiving portion 642. The toner shutter 643 closes and opens the toner inlet 6421. When the toner cartridge 7Y is mounted to the drum cartridge 6Y, the toner shutter 643 moves from a closed position to an open position while engaging with the toner cartridge 7Y. Moreover, when the toner cartridge 7Y is removed from the drum cartridge 6Y, the toner shutter 643 moves from the open position to the closed position while engaging with the toner cartridge 7Y.

Drum Cleaner

The drum cleaner 65Y is located between the drum side plate 641A and the drum side plate 641B in the second direction. The drum cleaner 65Y extends in the second direction. A first end of the drum cleaner 65Y in the second direction is connected to the drum side plate 641A. A second end of the drum cleaner 65Y in the second direction is connected to the drum side plate 641B. The drum cleaner 65Y is capable of collecting waste toner from the photoconductive drum 61Y. The waste toner is toner remaining on a surface of the photoconductive drum 61Y without being transferred to the intermediate transfer belt 91.

Figure 4:
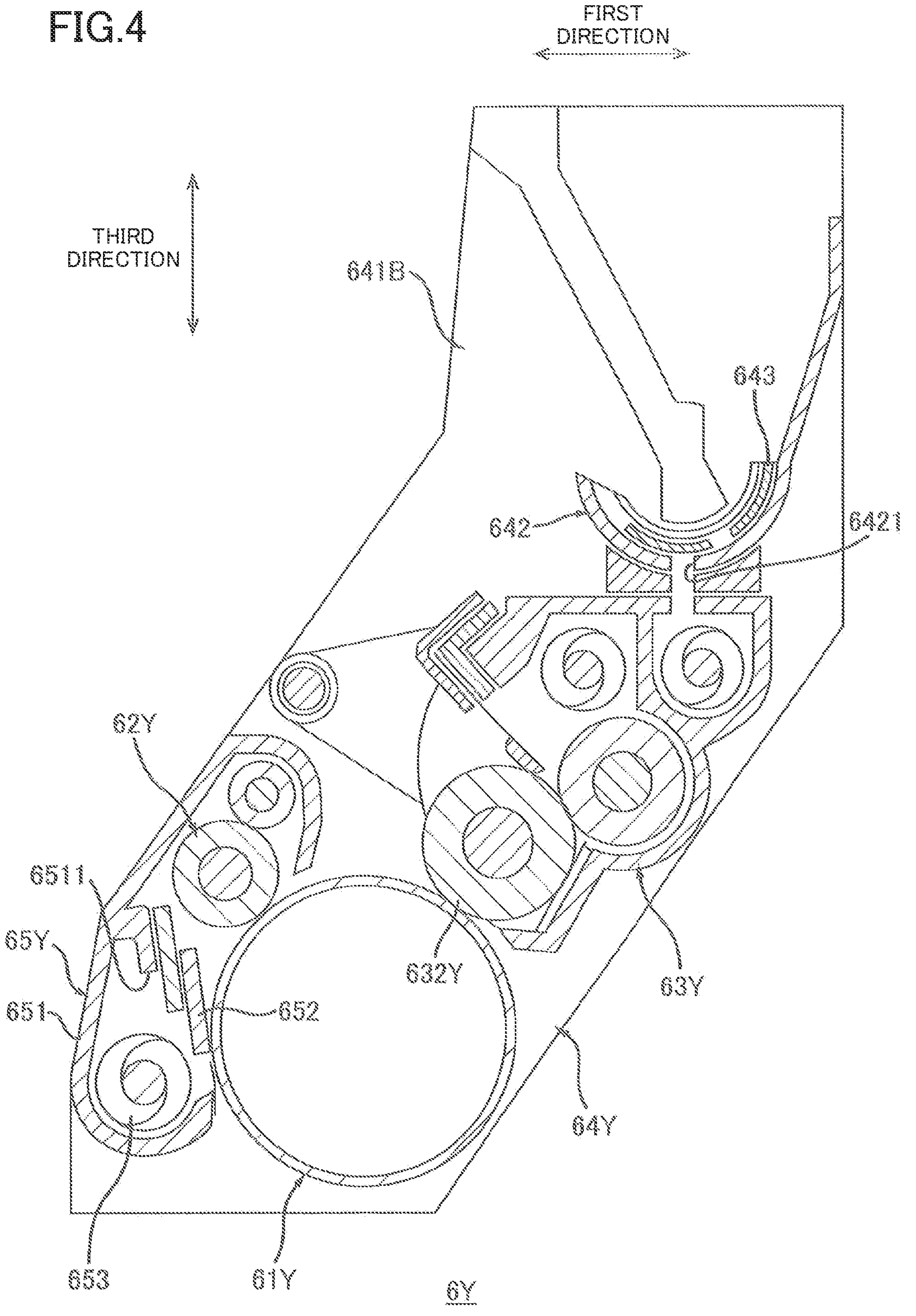
FIG. 4 is a cross-sectional view of the drum cartridge illustrated in FIG. 3.

As illustrated in FIG. 4, the drum cleaner 65Y includes a cleaning housing 651, a cleaning member 652 and a waste toner conveying member 653.

Cleaning Housing

As illustrated in FIG. 3, the cleaning housing 651 is located between the drum side plate 641A and the drum side plate 641B in the second direction. The cleaning housing 651 extends in the second direction. A first end of the cleaning housing 651 in the second direction is connected to the drum side plate 641A. A second end of the cleaning housing 651 in the second direction is connected to the drum side plate 641B. The cleaning housing 651 is capable of storing waste toner. As illustrated in FIG. 4, the cleaning housing 651 has an opening 6511.

Cleaning Member

The cleaning member 652 is attached to the cleaning housing 651. The cleaning member 652 extends in the second direction. The cleaning member 652 has a plate shape. An edge of the cleaning member 652 is in contact with the surface of the photoconductive drum 61Y. When the photoconductive drum 61Y rotates, waste toner on the surface of the photoconductive drum 61Y is removed from the surface of the photoconductive drum 61Y by contacting with the edge of the cleaning member 652. As a result of this, the cleaning member 652 cleans the circumferential surface of the photoconductive drum 61Y. The removed waste toner is conveyed through the opening 6511 and stored in the cleaning housing 651.

Waste Toner Conveying Member

The waste toner conveying member 653 is located in the cleaning housing 651. The waste toner conveying member 653 conveys, in the second direction, the waste toner in the cleaning housing 651 toward the waste toner discharge portion 66Y (see FIG. 3). In the present embodiment, the waste toner conveying member 653 is an auger screw. The waste toner conveying member 653 extends in the second direction.

Waste Toner Discharge Portion

Figure 5:
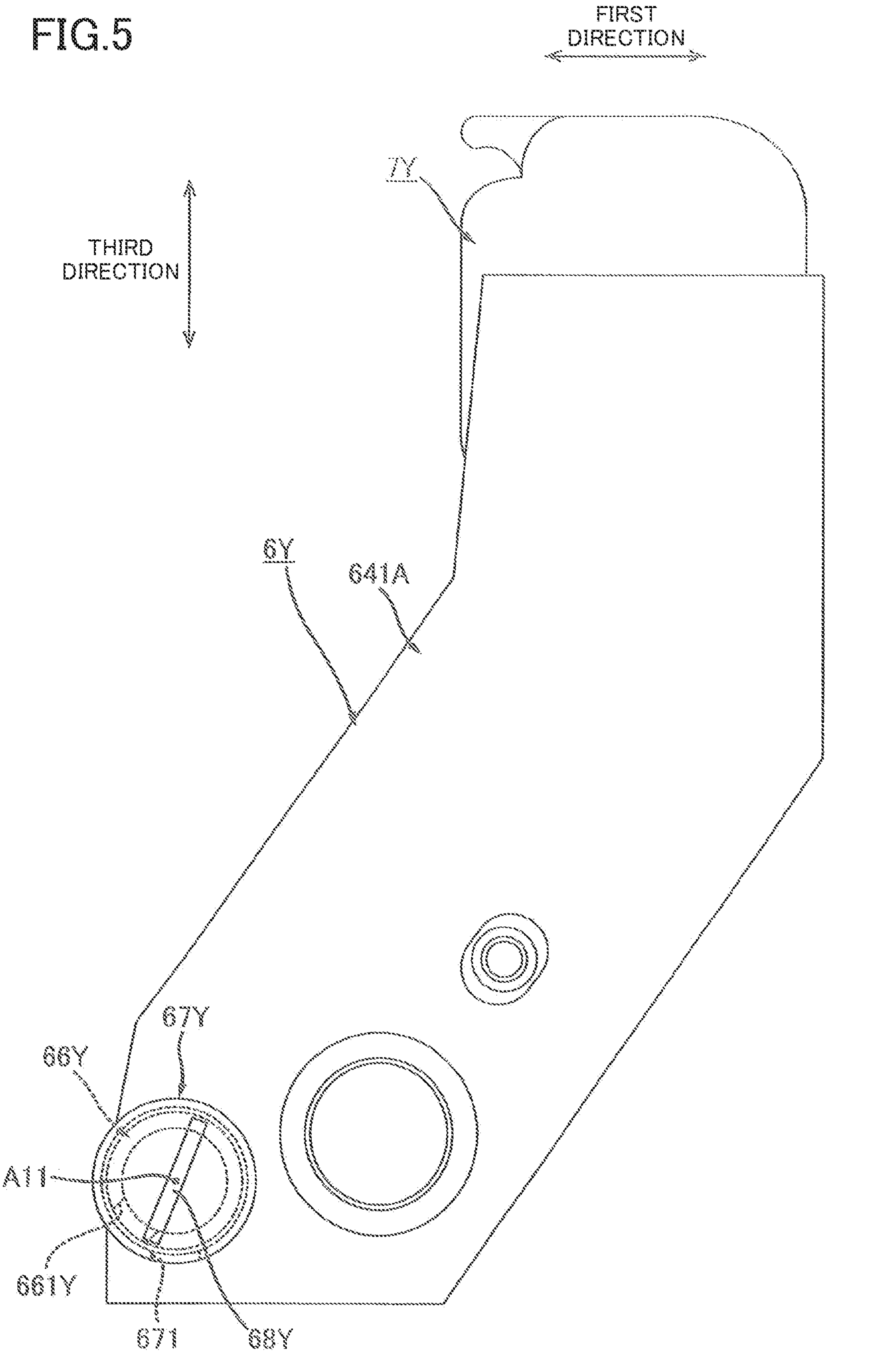
FIG. 5 is a side view of the drum cartridge illustrated in FIG. 3 and illustrating a state in which a shutter is positioned at a first closed position.

As illustrated in FIG. 3, the waste toner discharge portion 66Y is located on an opposite side of the drum side plate 641B with respect to the drum side plate 641A in the second direction. The waste toner discharge portion 66Y extends from the drum side plate 641A in the second direction. The waste toner discharge portion 66Y may be attached to the drum side plate 641A. The waste toner discharge portion 66Y has a cylindrical shape. An inner space of the waste toner discharge portion 66Y communicates with an inner space of the cleaning housing 651. As illustrated in FIG. 5, the waste toner discharge portion 66Y has a discharging outlet 661Y. In other words, the drum cartridge 6Y has the discharging outlet 661Y.

The discharging outlet 661Y communicates with the inner space of the waste toner discharge portion 66Y. The discharging outlet 661Y is capable of discharging the waste toner in the waste toner discharge portion 66Y. As a result of this, the discharging outlet 661Y is capable of discharging the waste toner collected by the drum cleaner 65Y.

Shutter

As illustrated in FIG. 3, the shutter 67Y is located on an opposite side of the drum side plate 641B with respect to the drum side plate 641A in the second direction. The shutter 67Y is attached to the waste toner discharge portion 66Y.

Figure 6:
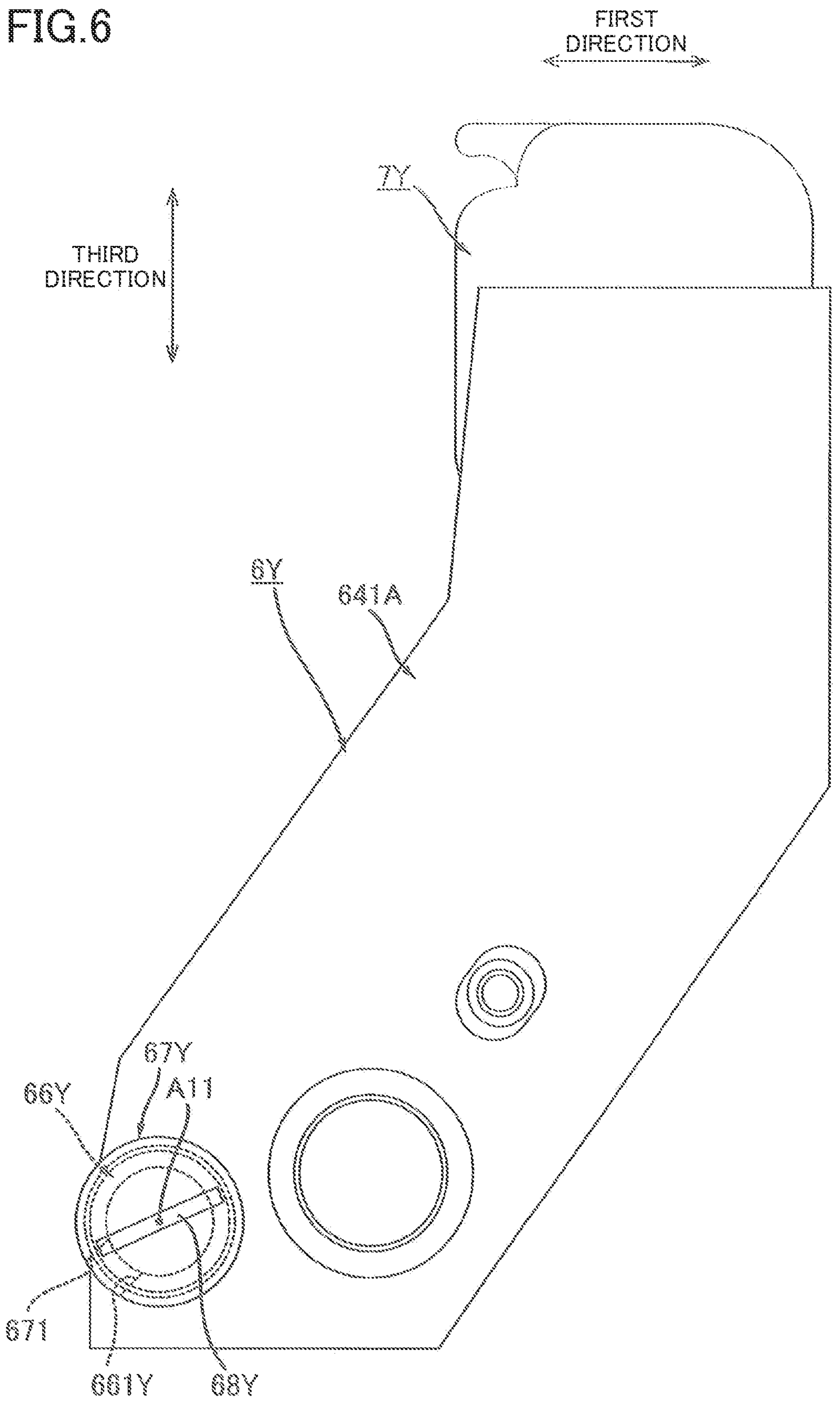
FIG. 6 is a side view of the drum cartridge illustrated in FIG. 3 and illustrating a state in which the shutter is positioned at a first open position.

As illustrated in FIG. 5 and FIG. 6, the shutter 67Y closes and opens the discharging outlet 661Y. The shutter 67Y is movable between a first closed position (see FIG. 5) and a first open position (see FIG. 6). The shutter 67Y is pivotable with respect to the waste toner discharge portion 66Y. The shutter 67Y is pivotable around an axis A11 between the first closed position and the first open position. As illustrated in FIG. 5, in a state in which the shutter 67Y is positioned at the first closed position, the shutter 67Y closes the discharging outlet 661Y. As illustrated in FIG. 6, in a state in which the shutter 67Y is positioned at the first open position, the discharging outlet 661Y is open.

The shutter 67Y extends in the second direction. The shutter 67Y has a cylindrical shape. The shutter 67Y is movable together with the engaging portion 68Y. The shutter 67Y has a shutter opening 671.

As illustrated in FIG. 6, in the state in which the shutter 67Y is positioned at the first open position, at least a part of the shutter opening 671 communicates with the discharging outlet 661Y. As a result of this, in the state in which the shutter 67Y is positioned at the first open position, the discharging outlet 661Y is open.

As illustrated in FIG. 5, it is noted that in the state in which the shutter 67Y is positioned at the first closed position, the shutter opening 671 is spaced apart from the discharging outlet 661Y. In the state in which the shutter 67Y is positioned at the first closed position, the shutter opening 671 does not communicate with the discharging outlet 661Y.

Engaging Portion

As illustrated in FIG. 3, the engaging portion 68Y is located at an opposite side of the drum side plate 641A with respect to the shutter 67Y in the second direction. The engaging portion 68Y is located on a side surface of the shutter 67Y in the second direction. In the state in which the drum cartridge 6Y is mounted on the drawer 5, the engaging portion 68Y engages with an engaging member 57Y of the drawer 5 (see FIG. 8). The engaging portion 68Y becomes rotatable together with the engaging member 57Y by engaging with the engaging member 57Y.

More specifically, the engaging portion 68Y protrudes, in the second direction, from the side surface of the shutter 67Y in the second direction. The engaging portion 68Y extends in a radial direction of the shutter 67Y. In the state in which the drum cartridge 6Y is mounted on the drawer 5, the engaging portion 68Y is fitted into a groove 571Y of the engaging member 57Y (see FIG. 8). The engaging portion 68Y becomes rotatable around the axis A11 together with the engaging member 57Y by being fitted into the groove 571Y of the engaging member 57Y.

Drum Cartridge

As described above, each of the drum cartridges 6M, 6C, 6K has the same configuration as the drum cartridge 6Y. That is, the drum cartridge 6M includes a drum cleaner 65M, a discharge outlet 661M and a shutter 67M. The drum cleaner 65M is capable of collecting waste toner from the photoconductive drum 61M. The discharge outlet 661M is capable of discharging the waste toner collected by the drum cleaner 65M. The shutter 67M is movable between a second closed position and a second open position. In a state in which the shutter 67M is positioned at the second closed position, the shutter 67M closes the discharge outlet 661M. In a state in which the shutter 67M is positioned at the second open position, the discharge outlet 661M is open.

Details of Drawer

There will be described in detail the drawer 5 with reference to FIG. 2 and FIG. 7 to FIG. 14B.

It is noted that "the second direction" in the following description of the drawer 5 is "the second direction" in the state in which the drum cartridge 6Y is mounted on the drawer 5.

Figure 7:
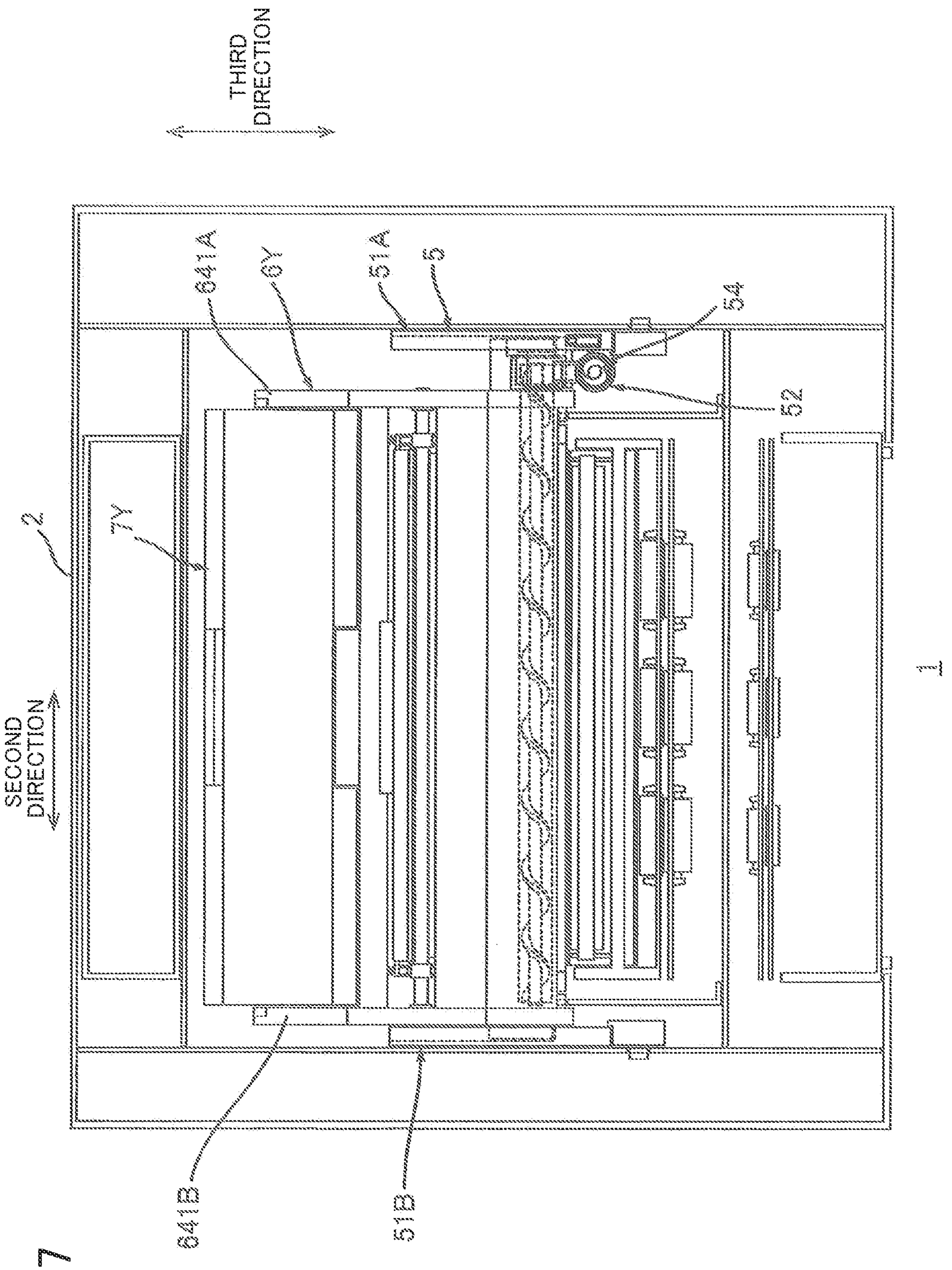
FIG. 7 is a cross-sectional view of the image forming apparatus illustrated in FIG. 1.
Figure 14A:
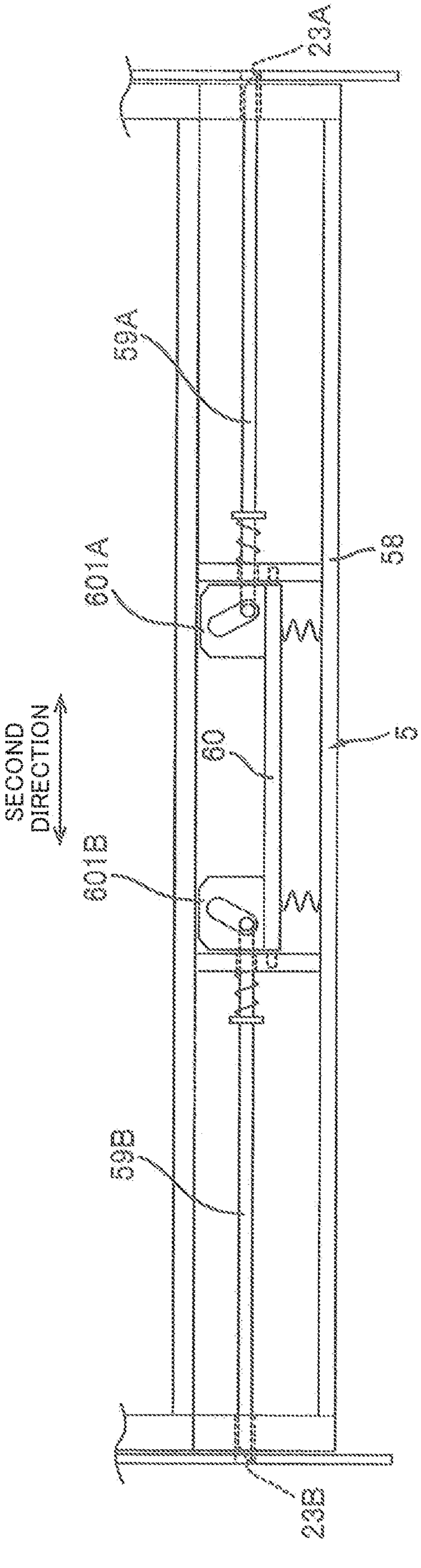
FIG. 14A is a view for explaining a lock of the drawer positioned at the accommodated position and illustrating a state in which the drawer is locked to a body housing.

As illustrated in FIG. 7, the drawer 5 includes a first side plate 51A, a second side plate 51B, a waste toner tube 52, a plurality of waste toner shutters 53Y, 53M, 53C, 53K (see FIG. 8), a conveying member 54, a shutter driving member 55 (see FIG. 11), a spring 56 (see FIG. 11), the plurality of engaging members 57Y, 57M, 57C, 57K (see FIG. 8), a grip 58 (see FIG. 14A), the plurality of lock members 59A, 59B (see FIG. 14A) and a bar 60 (see FIG. 14A).

First Side Plate and Second Side Plate

The first side plate 51A is located at a first end of the drawer 5 in the second direction. In the state in which the drum cartridge 6Y is mounted on the drawer 5, the first side plate 51A is opposed to the drum side plate 641A in the second direction. In the state in which the drum cartridge 6Y is mounted on the drawer 5, the first side plate 51A is located on an opposite side of the drum side plate 641B with respect to the drum side plate 641A in the second direction. The first side plate 51A supports the waste toner tube 52. In the state in which the drum cartridge 6Y is mounted on the drawer 5, the first side plate 51A supports the first end of the drum cartridge 6Y in the second direction.

The second side plate 51B is located at a second end of the drawer 5 in the second direction. The second side plate 51B is spaced apart from the first side plate 51A in the second direction. In the state in which the drum cartridge 6Y is mounted on the drawer 5, the second side plate 51B is opposed to the drum side plate 641B in the second direction. In the state in which the drum cartridge 6Y is mounted on the drawer 5, the second side plate 51B is located on an opposite side of the drum side plate 641A with respect to the drum side plate 641B in the second direction. In the state in which the drum cartridge 6Y is mounted on the drawer 5, the second side plate 51B supports the second end of the drum cartridge 6Y in the second direction.

Waste Toner Tube

Figure 8:
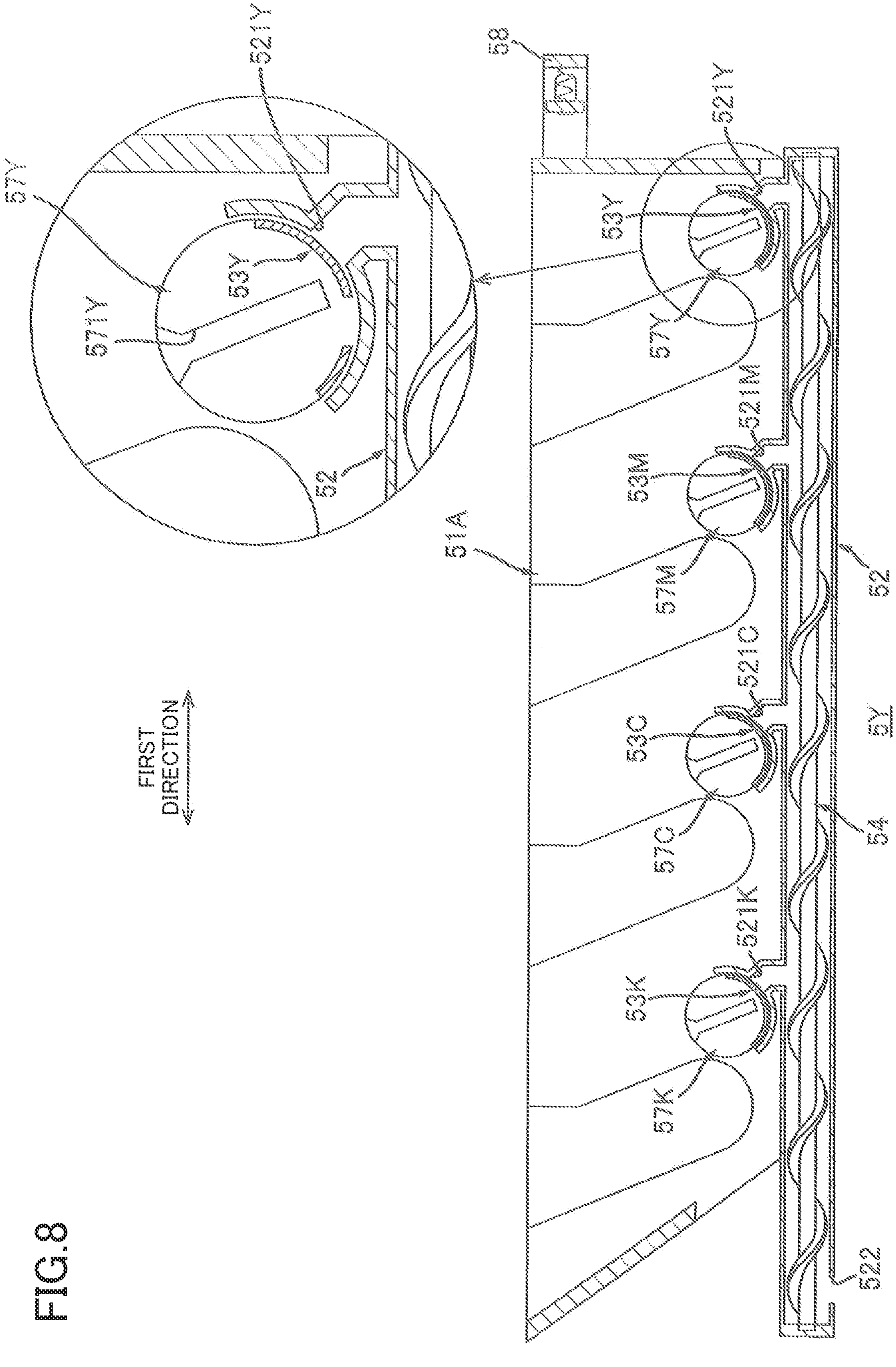
FIG. 8 is a cross-sectional view of the drawer illustrated in FIG. 7 which passes a toner tube.
Figure 10:
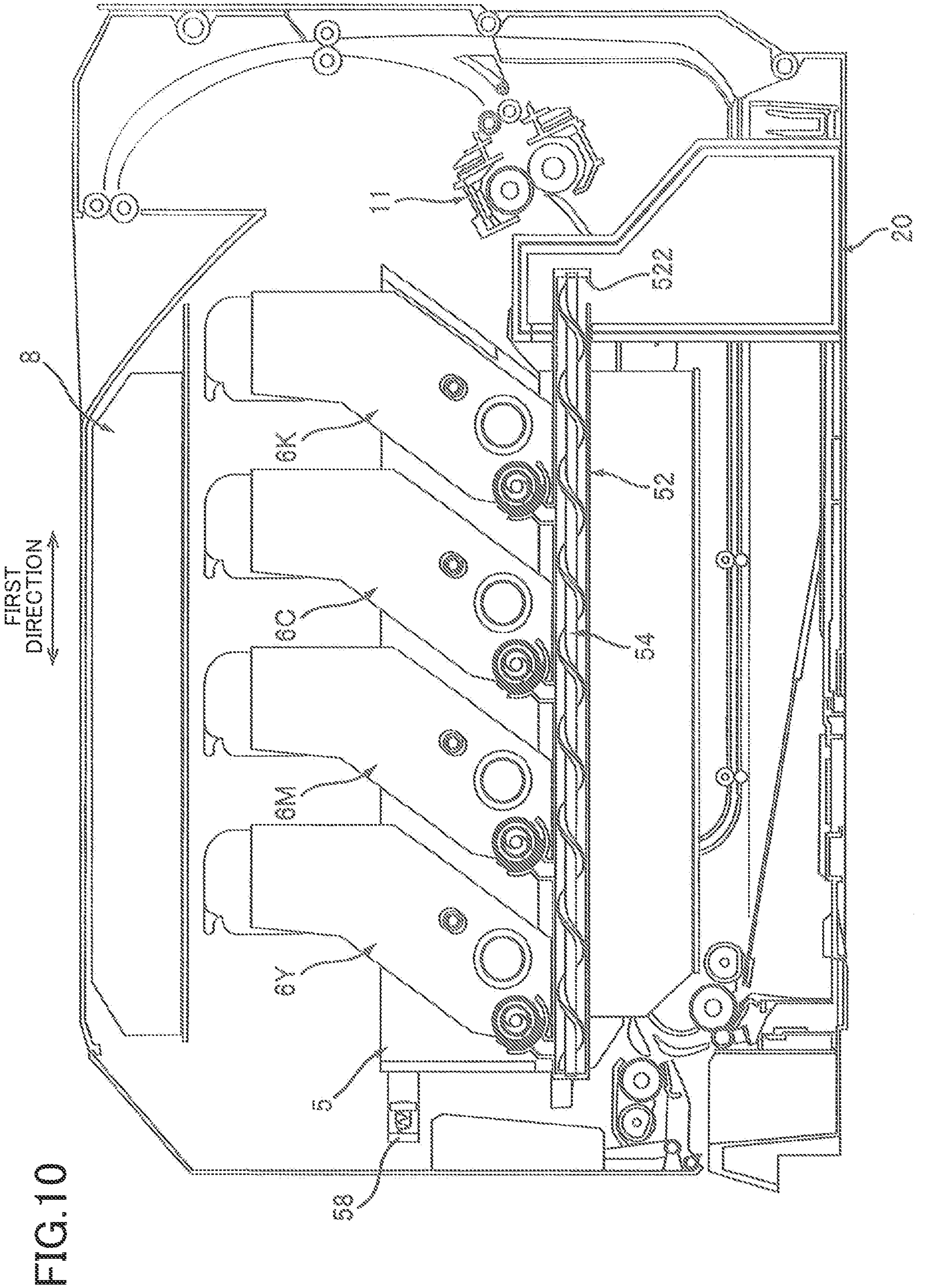
FIG. 10 is a view for explaining a connection between a waste toner tube and a waste toner storage.

The waste toner tube 52 is located between the first side plate 51A and the second side plate 51B in the second direction. As illustrated in FIG. 8, the waste toner tube 52 extends in the first direction. Waste toner is allowed to pass through the waste toner tube 52. As illustrated in FIG. 10, in the state in which the drawer 5 is positioned at the accommodated position, the waste toner tube 52 is connected to a waste toner storage 20. On the other hand, in the state in which the drawer 5 is positioned at the drawn position (see FIG. 2), the waste toner tube 52 is spaced apart from the waste toner storage 20.

It is noted that the image forming apparatus 1 includes the waste toner storage 20. The waste toner storage 20 is located in the body housing 2. The waste toner storage 20 stores waste toner.

As illustrated in FIG. 8, the waste toner tube 52 includes a plurality of waste toner inlets 521Y, 521M, 521C, 521K and a waste toner discharging outlet 522.

The plurality of waste toner inlets 521Y, 521M, 521C, 521K are arranged in the first direction. The waste toner inlet 521Y is capable of receiving waste toner discharged from the discharging outlet 661Y (see FIG. 5) of the drum cartridge 6Y which is being mounted on the drawer 5. The waste toner inlet 521M is capable of receiving waste toner discharged from the discharge outlet 661M of the drum cartridge 6M which is being mounted on the drawer 5. The waste toner inlet 521C is capable of receiving waste toner discharged from a discharging outlet 661C of the drum cartridge 6C which is being mounted on the drawer 5. The waste toner inlet 521K is capable of receiving waste toner discharged from a discharging outlet 661K of the drum cartridge 6K which is being mounted on the drawer 5.

The waste toner discharging outlet 522 is capable of discharging the waste toner in the waste toner tube 52. The waste toner discharging outlet 522 is located at a first end of the waste toner tube 52 in the first direction. As illustrated in FIG. 10, in a state in which the waste toner tube 52 is connected to the waste toner storage 20, the waste toner discharging outlet 522 is located in the waste toner storage 20.

Waste Toner Shutter

Figure 9:
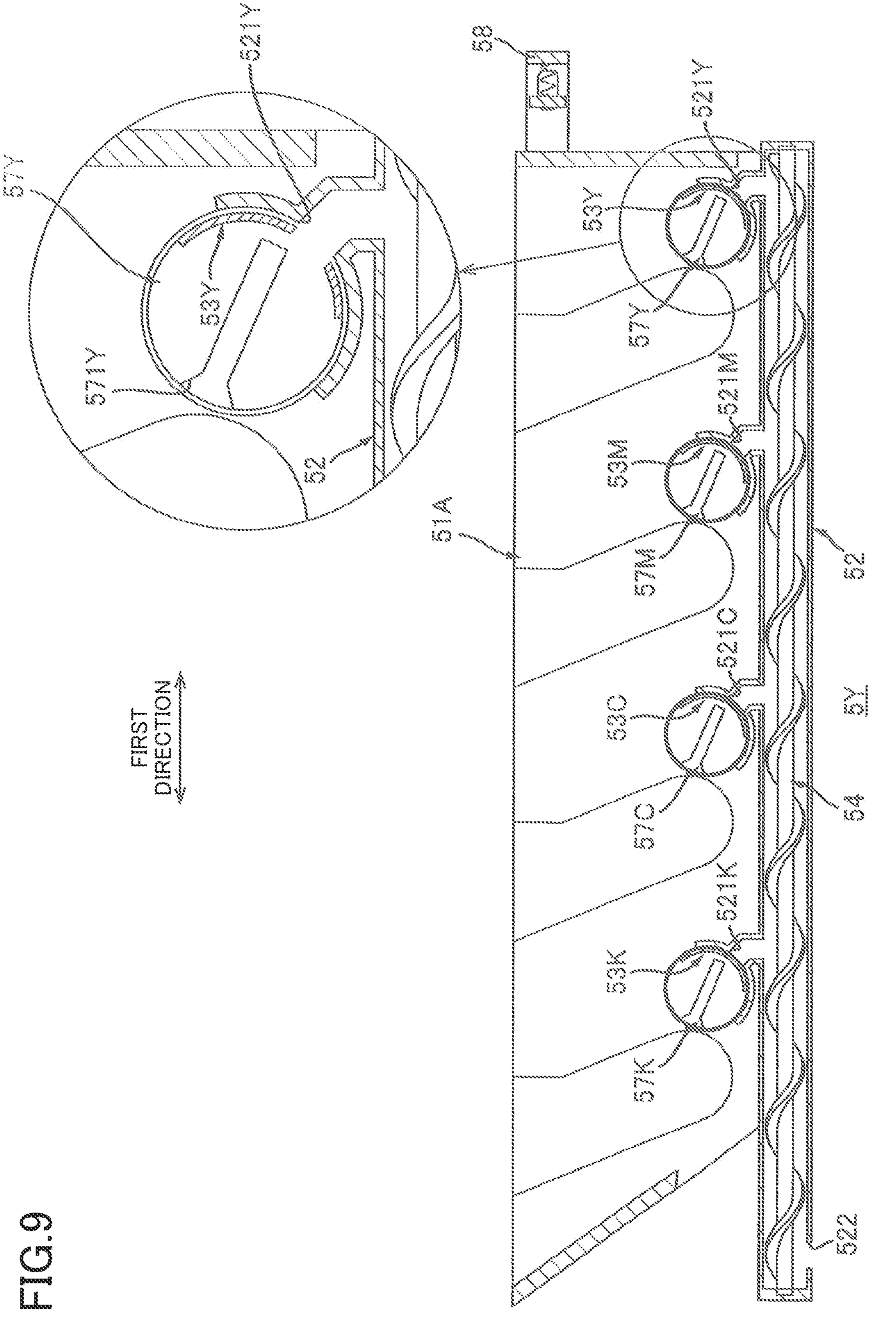
FIG. 9 is a view illustrating a state in which a waste toner shutter illustrated in FIG. 8 is positioned at a first waste toner open position.

As illustrated in FIG. 8 and FIG. 9, the waste toner shutter 53Y is movable between a first waste toner closed position (see FIG. 8) and a first waste toner open position (see FIG. 9). The waste toner shutter 53Y is pivotable between the first waste toner closed position (see FIG. 8) and the first waste toner open position (see FIG. 9). As illustrated in FIG. 8, in a state in which the waste toner shutter 53Y is positioned at the first waste toner closed position, the waste toner shutter 53Y closes the waste toner inlet 521Y. As illustrated in FIG. 9, in a state in which the waste toner shutter 53Y is positioned at the first waste toner open position, the waste toner inlet 521Y is open.

Figure 11:
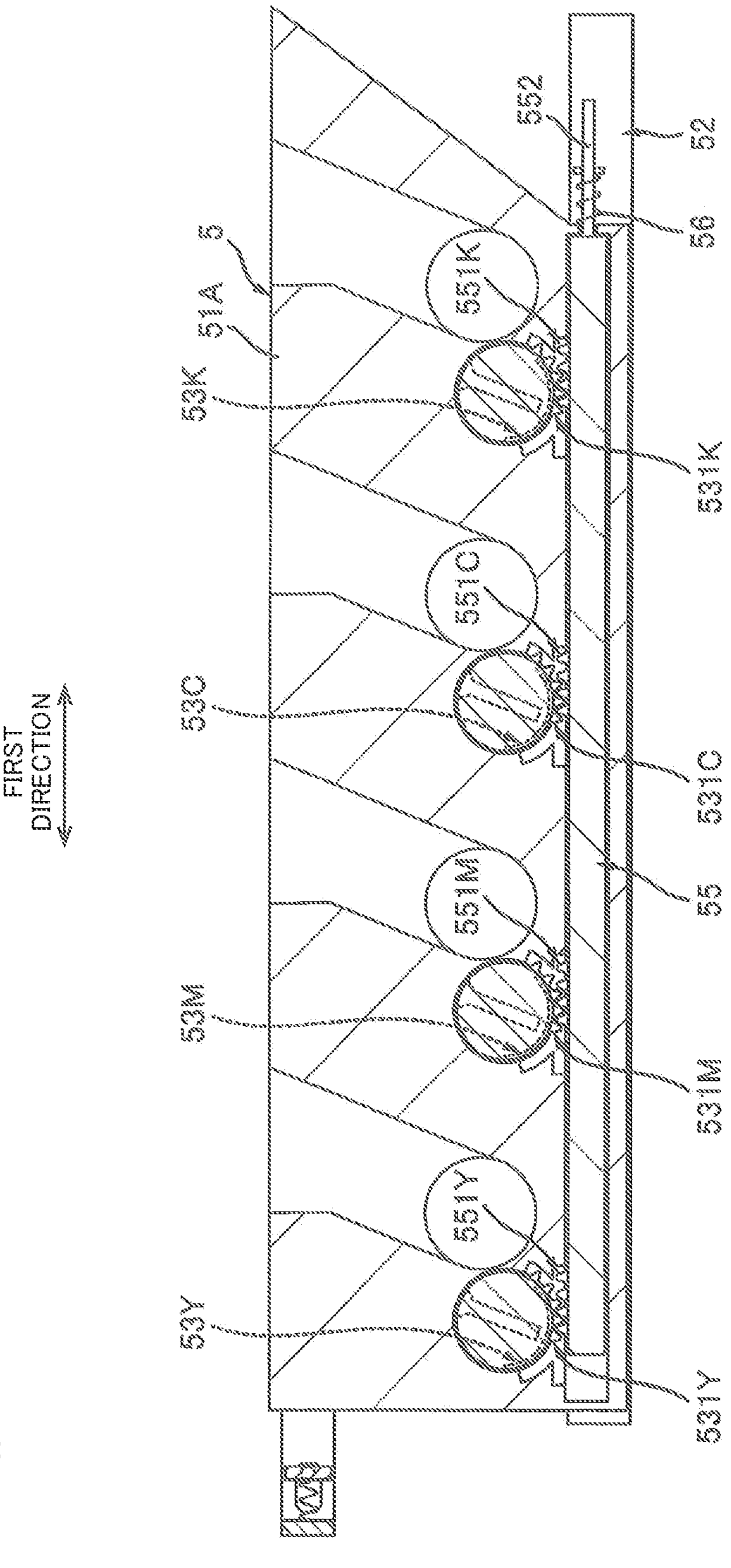
FIG. 11 is a cross-sectional view of the drawer illustrated in FIG. 7 and which passes the shutter driving member.

The waste toner shutter 53Y has an arc shape. In the state in which the drum cartridge 6Y is mounted on the drawer 5, the waste toner shutter 53Y extends along a circumferential surface of the shutter 67Y of the drum cartridge 6Y (see FIG. 3). As illustrated in FIG. 11, the waste toner shutter 53Y includes a gear 531Y. The gear 531Y includes a plurality of teeth. The plurality of teeth are arranged in a direction in which the waste toner shutter 53Y moves.

Each of the waste toner shutters 53M, 53C, 53K has the same configuration as the waste toner shutter 53Y. That is, the waste toner shutter 53M is movable between a second waste toner closed position (see FIG. 8) and a second waste toner open position (see FIG. 9). As illustrated in FIG. 8, in a state in which the waste toner shutter 53M is positioned at the second waste toner closed position, the waste toner shutter 53M closes the waste toner inlet 521M. As illustrated in FIG. 9, in a state in which the waste toner shutter 53M is positioned at the second waste toner open position, the waste toner inlet 521M is open. As illustrated in FIG. 11, the waste toner shutter 53M includes a gear 531M. An explanation of the waste toner shutters 53M, 53C, 53K is dispensed with.

Conveying Member

As illustrated in FIG. 8, the conveying member 54 is located in the waste toner tube 52. The conveying member 54 is capable of conveying waste toner in the waste toner tube 52 toward the waste toner discharging outlet 522. As illustrated in FIG. 10, in the state in which the drawer 5 is positioned at the accommodated position, the conveying member 54 is capable of conveying the waste toner in the waste toner tube 52 toward the waste toner storage 20. In the present embodiment, the conveying member 54 is an auger screw. The conveying member 54 extends in the first direction.

Shutter Driving Member

As illustrated in FIG. 11, the shutter driving member 55 is supported by the first side plate 51A. In the present embodiment, the shutter driving member 55 is located in the first side plate 51A. The shutter driving member 55 extends in the first direction. The shutter driving member 55 is movable in the first direction with respect to the waste toner tube 52 between a first position (see FIG. 11) and a second position (see FIG. 12). Moreover, the shutter driving member 55 is movable with respect to the first side plate 51A in the first direction between the first position and the second position. In the state in which the drawer 5 is positioned at the drawn position, the shutter driving member 55 is positioned at the first position (see FIG. 11). In the state in which the drawer 5 is positioned at the accommodated position, the shutter driving member 55 is positioned at the second position (see FIG. 12). The shutter driving member 55 drives the plurality of waste toner shutters 53Y, 53M, 53C, 53K.

More specifically, the shutter driving member 55 includes a plurality of rack portions 551Y, 551M, 551C, 551K and an acted portion 552.

The plurality of rack portions 551Y, 551M, 551C, 551K are arranged in the first direction. The rack portion 551Y meshes with the gear 531Y The rack portion 551Y includes a plurality of teeth. The plurality of teeth are arranged in the first direction. The rack portion 551M meshes with the gear 531M. The rack portion 551M includes a plurality of teeth. The plurality of teeth are arranged in the first direction. The rack portion 551C meshes with a gear 531C. The rack portion 551C includes a plurality of teeth. The plurality of teeth are arranged in the first direction. The rack portion 551K meshes with a gear 531K. The rack portion 551K includes a plurality of teeth. The plurality of teeth are arranged in the first direction.

In a state in which the rack portion 551Y meshes with the gear 531Y, the rack portion 551M meshes with the gear 531M, the rack portion 551C meshes with the gear 531C and the rack portion 551K meshes with the gear 531K, the shutter driving member 55 is capable of driving the plurality of waste toner shutters 53Y, 53M, 53C, 53K.

In a state in which the shutter driving member 55 is positioned at the first position, the waste toner shutter 53Y is positioned at the first waste toner closed position and the waste toner shutter 53M is positioned at the second waste toner closed position.

Figure 12:
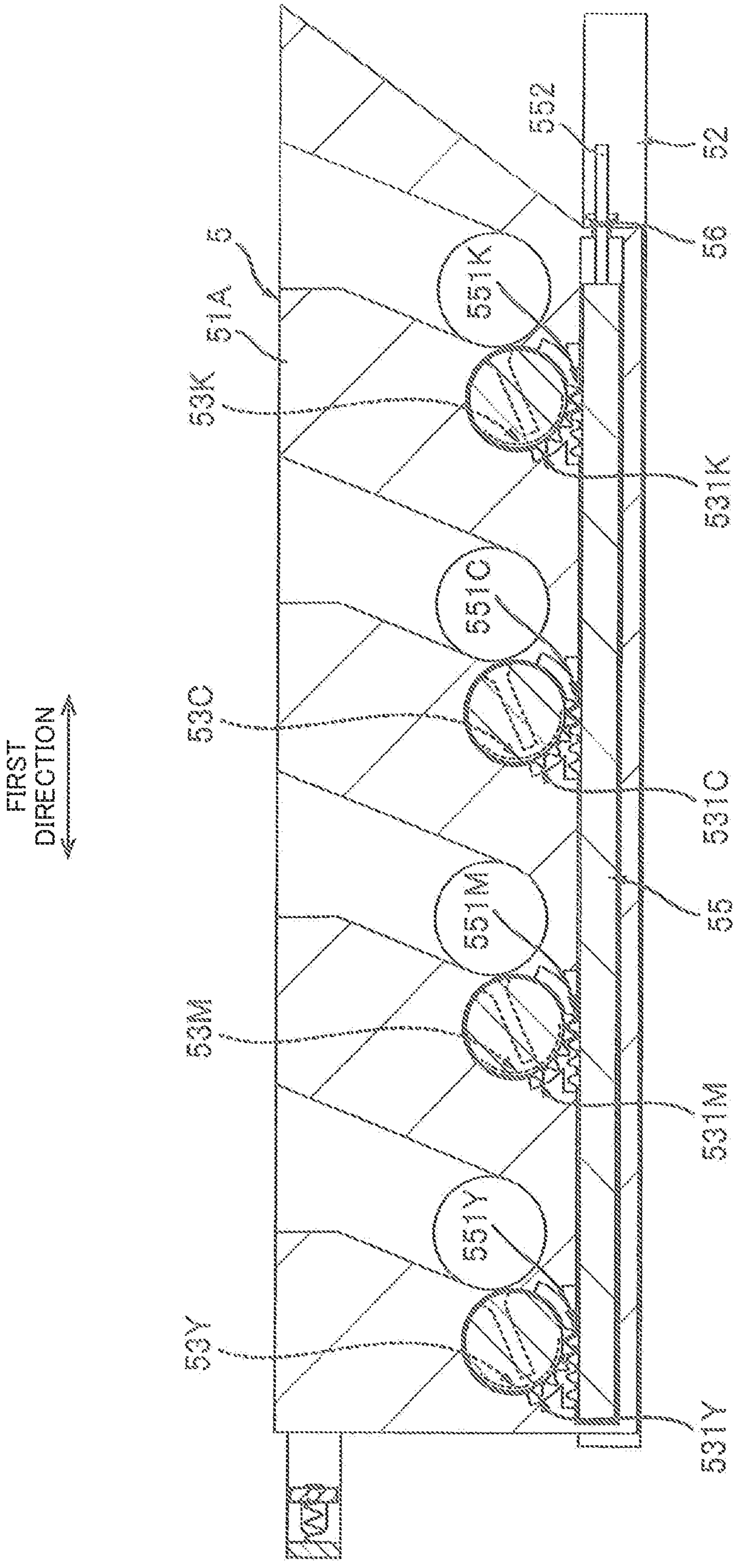
FIG. 12 is a view illustrating a state in which the shutter driving member illustrated in FIG. 11 is positioned at a second position.

As illustrated in FIG. 12, in a state in which the shutter driving member 55 is positioned at the second position, the waste toner shutter 53Y is positioned at the first waste toner open position and the waste toner shutter 53M is positioned at the second waste toner open position.

As illustrated in FIG. 11, the acted portion 552 is located at a downstream end of the drawer 5 in a direction in which the drawer 5 moves from the drawn position to the accommodated position. The acted portion 552 is located at a downstream end of the shutter driving member 55 in the direction in which the drawer 5 moves from the drawn position to the accommodated position. The acted portion 552 extends in the first direction. The acted portion 552 extends from the downstream end of the shutter driving member 55 in the direction in which the drawer 5 moves from the drawn position to the accommodated position.

Figure 13:
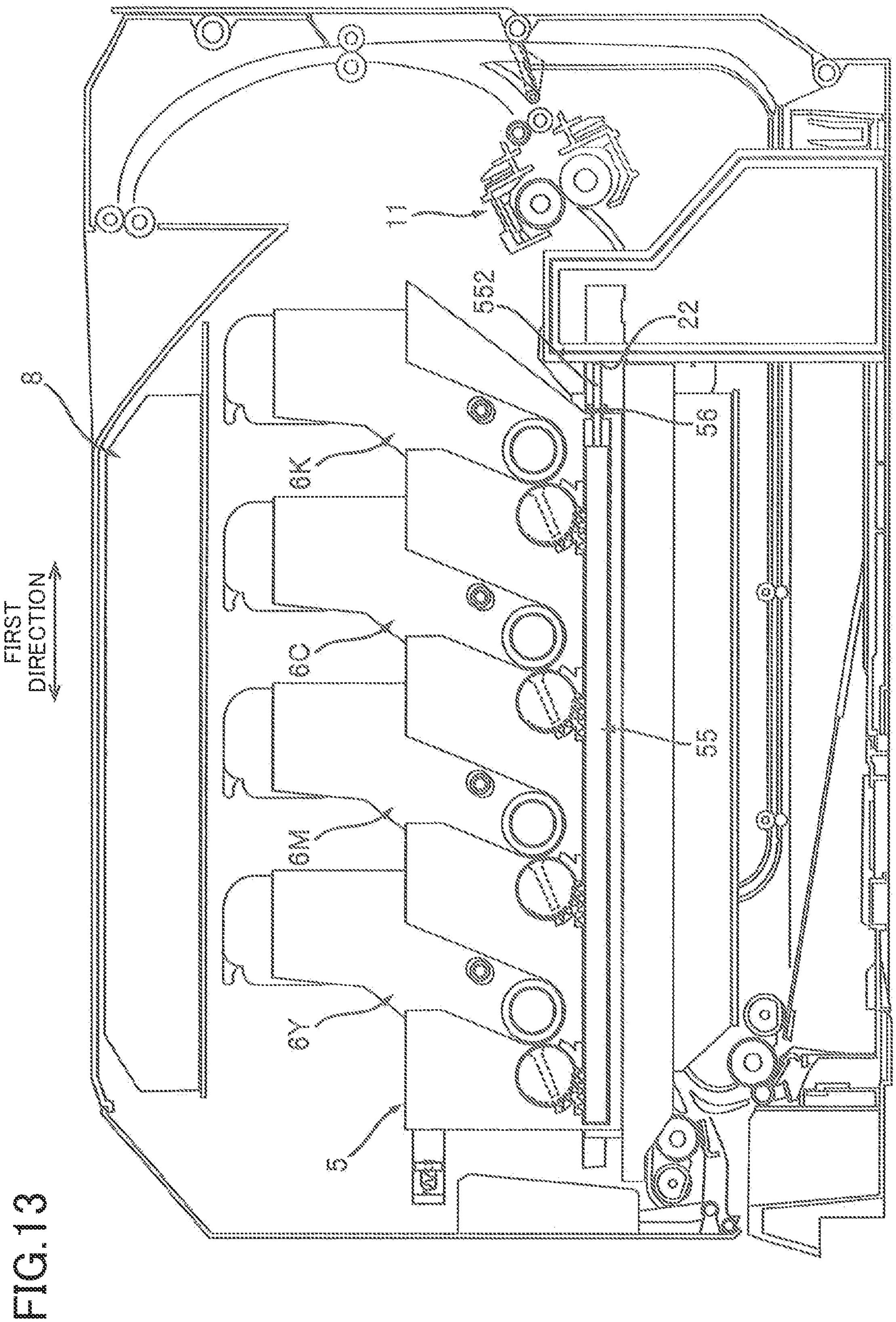
FIG. 13 is a view illustrating a state in which the drawer illustrated in FIG. 2 is positioned at an accommodated position and the shutter driving member is positioned at a second position.

Here, as illustrated in FIG. 13, the body housing 2 includes an acting portion 22. In the state in which the drawer 5 is positioned at the accommodated position, the acting portion 22 is capable of acting on the acted portion 552. More specifically, in the state in which the drawer 5 is positioned at the accommodated position, the acting portion 22 is capable of coming into contact with the acted portion 552.

The shutter driving member 55 moves from the first position to the second position in accordance with a movement of the drawer 5 from the drawn position (see FIG. 2) to the accommodated position (see FIG. 13) while the acting portion 22 is in contact with the acted portion 552.

The shutter driving member 55 becomes movable from the second position to the first position in accordance with a movement of the drawer 5 from the accommodated position (see FIG. 13) to the drawn position (see FIG. 2) while a contact of the acted portion 552 with the acting portion 22 is released.

Spring

As illustrated in FIG. 11, the spring 56 presses the shutter driving member 55 in a direction directed from the second position (see FIG. 12) toward the first position (see FIG. 11). As illustrated in FIG. 2 and FIG. 13, when the drawer 5 moves from the drawn position to the accommodated position, the shutter driving member 55 moves from the first position to the second position against a pressing force of the spring 56 while the acting portion 22 acts on the acted portion 552. When the drawer 5 moves from the accommodated position to the drawn position, the shutter driving member 55 moves from the second position to the first position by the pressing force of the spring 56 while an act of the acting portion 22 on the acted portion 552 is released. That is, the shutter driving member 55 moves with respect to the first side plate 51A in the first direction in accordance with a movement of the drawer 5 between the accommodated position and the drawn position.

Engaging Member

As illustrated in FIG. 8, the engaging member 57Y is connected to the waste toner shutter 53Y. The engaging member 57Y is movable together with the waste toner shutter 53Y. The engaging member 57Y has a disc shape. The engaging member 57Y includes the groove 571Y.

The groove 571Y extends in a radial direction of the engaging member 57Y. In the state in which the drum cartridge 6Y is mounted on the drawer 5, the engaging portion 68Y of the drum cartridge 6Y (see FIG. 3) is fitted into the groove 571Y. The shutter 67Y becomes movable together with the waste toner shutter 53Y in a state in which the engaging portion 68Y is fitted into the groove 571Y.

As a result of this, the shutter driving member 55 can drive the shutter 67Y via the waste toner shutter 53Y. In other words, in the state in which the drum cartridge 6Y is mounted on the drawer 5, the shutter driving member 55 can cause the shutter 67Y to move in accordance with a movement of the shutter driving member 55. As illustrated in FIG. 11, in the state in which the shutter driving member 55 is positioned at the first position, the waste toner shutter 53Y is positioned at the first waste toner closed position and the shutter 67Y is positioned at the first closed position (see FIG. 5). As illustrated in FIG. 12, in the state in which the shutter driving member 55 is positioned at the second position, the waste toner shutter 53Y is positioned at the first waste toner open position and the shutter 67Y is positioned at the first open position (see FIG. 6). That is, the shutter 67Y moves between the first closed position and the first open position in accordance with a movement of the shutter driving member 55 with respect to the first side plate 51A in the first direction.

It is noted that the engaging member 57Y functions as a drum locking member which locks the drum cartridge 6Y to the drawer 5. As illustrated in FIG. 12, in the state in which the shutter driving member 55 is positioned at the second position, the engaging member 57Y is positioned at a first lock position. In a state in which the engaging member 57Y is positioned at the first lock position, the engaging member 57Y locks the drum cartridge 6Y to the drawer 5. As illustrated in FIG. 11, in the state in which the shutter driving member 55 is positioned at the first position, the engaging member 57Y is positioned at a first lock release position. In a state in which the engaging member 57Y is positioned at the first lock release position, the engaging member 57Y releases a lock of the drum cartridge 6Y to the drawer 5.

Moreover, in a state in which the drum cartridges 6M, 6C, 6K are mounted on the drawer 5, the shutter driving member 55 can cause the shutters 67M, 67C, 67K to move in accordance with the movement of the shutter driving member 55. That is, in a state in which the drum cartridge 6M is mounted on the drawer 5, the shutter driving member 55 can cause the shutter 67M to move in accordance with the movement of the shutter driving member 55. In the state in which the shutter driving member 55 is positioned at the first position, the shutter 67M is positioned at the second closed position. In the state in which the shutter driving member 55 is positioned at the second position, the shutter 67M is positioned at the second open position. That is, the shutter 67M moves between the second closed position and the second open position in accordance with the movement of the shutter driving member 55 with respect to the first side plate 51A in the first direction. Moreover, in the state in which the shutter driving member 55 is positioned at the second position, an engaging portion 57M is positioned at a second lock position. In a state in which the engaging portion 57M is positioned at the second lock position, the engaging portion 57M locks the drum cartridge 6M to the drawer 5. In the state in which the shutter driving member 55 is positioned at the first position, the engaging portion 57M is positioned at a second lock release position. In a state in which the engaging portion 57M is positioned at the second lock release position, the engaging portion 57M releases a lock of the drum cartridge 6M to the drawer 5.

Grip

The grip 58 is located at an upstream end of the drawer 5 in a direction in which the drawer 5 moves from the drawn position to the accommodated position. When the user moves the drawer 5, the user can grab the grip 58.

Lock Member

As illustrated in FIG. 14A, the lock member 59A and the lock member 59B lock the drawer 5 to the accommodated position.

More specifically, the body housing 2 includes holes 23A, 23B. The hole 23A is formed on a first inner surface of a first end portion of the body housing 2 in the second direction. The hole 23B is formed on a second inner surface, which is opposed to the first inner surface in the second direction, of a second end portion of the body housing 2 in the second direction.

Figure 14B:
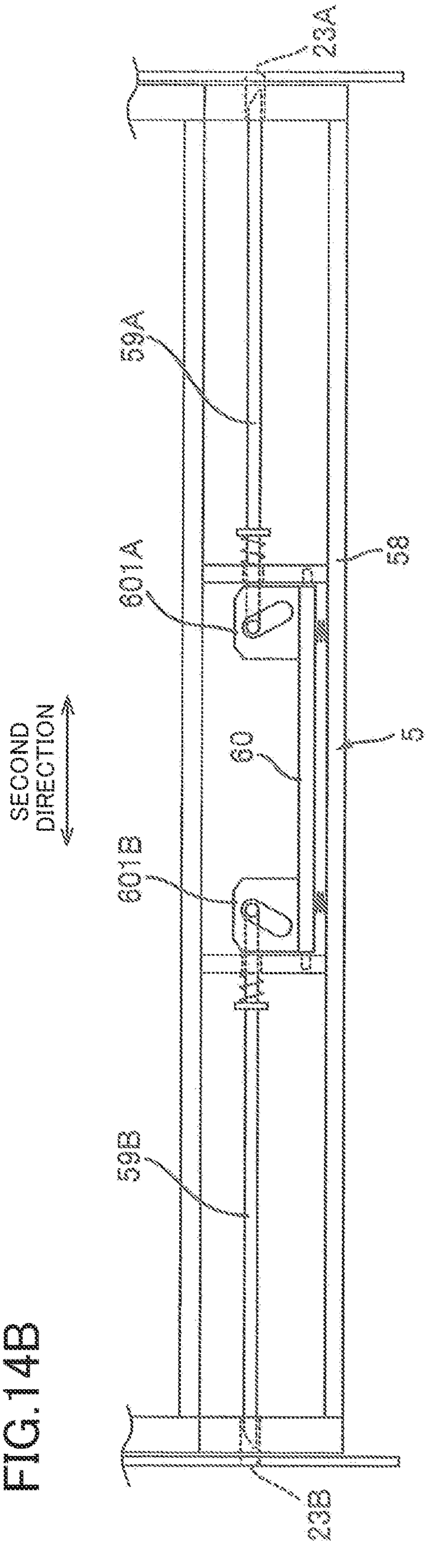
FIG. 14B is a view for explaining the lock of the drawer positioned at the accommodated position and illustrating a state in which the lock of the drawer to the body housing is released.

As illustrated in FIG. 14A and FIG. 14B, in the state in which the drawer 5 is positioned at the accommodated position, the lock member 59A is movable in the second direction between a position at which the lock member 59A fits into the hole 23A (see FIG. 14A) and a position at which the lock member 59A goes out from the hole 23A (see FIG. 14B).

In the state in which the drawer 5 is positioned at the accommodated position, the lock member 59B is movable in the second direction between a position at which the lock member 59B fits into the hole 23B (see FIG. 14A) and a position at which the lock member 59B goes out from the hole 23B (see FIG. 14B).

When the lock member 59A fits into the hole 23A and the lock member 59B fits into the hole 23B, the drawer 5 is locked to the accommodated position. When the lock member 59A goes out from the hole 23A and the lock member 59B goes out from the hole 23B, a lock of the drawer 5 to the accommodated position is released.

Bar

The bar 60 moves the lock member 59A in a direction in which the lock member 59A goes out from the hole 23A and moves the lock member 59B in a direction in which the lock member 59B goes out from the hole 23B. The bar 60 is connected to the lock member 59A via a cam 601A, and the bar is connected to the lock member 59B via a cam 601B. The bar 60 is movable between a distant position distant from the grip 58 (see FIG. 14A) and a close position closer to the grip 58 (see FIG. 14B) than the distant position.

When the bar 60 moves in a direction in which the bar 60 moves toward the grip 58, the lock member 59A moves in the direction in which the lock member 59A goes out from the hole 23A and the lock member 59B moves in the direction in which the lock member 59B goes out from the hole 23B.

When the bar 60 moves in a direction in which the bar 60 moves away from the grip 58, the lock member 59A moves in a direction in which the lock member 59A goes into the hole 23A and the lock member 59B moves in a direction in which the lock member 59B goes into the hole 23B.

Effects

According to the image forming apparatus 1, as illustrated in FIG. 13, it is possible to position the shutter 67Y at the first open position (see FIG. 5) and position the shutter 67M at the second open position in the state in which the drawer 5 is positioned at the accommodated position.

Accordingly, in the state in which the drawer 5 is positioned at the accommodated position, it is possible to convey the waste toner from the drum cartridge 6Y and the waste toner from the drum cartridge 6M by the waste toner tube 52.

Moreover, as illustrated in FIG. 2, in the state in which the drawer 5 is positioned at the drawn position, it is possible to position the shutter 67Y at the first closed position (see FIG. 6) and position the shutter 67M at the second closed position.

As a result of this, it is possible to prevent the waste toner from being spilled from the drum cartridge 6Y and the drum cartridge 6M when the drum cartridge 6Y and the drum cartridge 6M are removed from the drawer 5.

According to the image forming apparatus 1, as illustrated in FIG. 2 and FIG. 13, the shutter driving member 55 moves from the first position (see FIG. 2) to the second position (see FIG. 13) in accordance with the movement of the drawer 5 from the drawn position to the accommodated position, and moves from the second position (see FIG. 13) to the first position (see FIG. 2) in accordance with the movement of the drawer 5 from the accommodated position to the drawn position.

According to the configuration, it is possible to close and open the shutters 67Y, 67M, 67C, 67K by utilizing a force of the user at a time when the user moves the drawer 5.

Accordingly, it is possible to improve usability of the image forming apparatus 1.

According to the image forming apparatus 1, as illustrated in FIG. 11 and FIG. 12, the rack portion 551Y of the shutter driving member 55 meshes with the gear 531Y of the waste toner shutter 53Y, the rack portion 551M of the shutter driving member 55 meshes with the gear 531M of the waste toner shutter 53M, the rack portion 551C of the shutter driving member 55 meshes with the gear 531C of the waste toner shutter 53C, and the rack portion 551K of the shutter driving member 55 meshes with the gear 531K of the waste toner shutter 53K. As a result of this, it is possible to move the plurality of waste toner shutters 53Y, 53M, 53C, 53K in accordance with the movement of the shutter driving member 55.

Accordingly, the user needs not close and open each of the plurality of waste toner shutters 53Y, 53M, 53C, 53K, and it is possible to improve usability of the image forming apparatus 1.

Modification

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

There will be described next modifications with reference to FIG. 15 and FIG. 16. In the modifications, it is noted that the same reference numerals as used in the first embodiment are used to designate the corresponding elements of the modifications, and an explanation of which is dispensed with.

As illustrated in FIG. 15 and FIG. 16, in the state in which the drawer 5 is positioned at the accommodated position, a shutter driving member 100 may move from a first position (see FIG. 15) to a second position (see FIG. 16) in accordance with a movement of the cover 3 from the cover open position (see FIG. 15) to the cover closed position (see FIG. 16). Moreover, in the state in which the drawer 5 is positioned at the accommodated position, the shutter driving member 100 may move from the second position (see FIG. 16) to the first position (see FIG. 15) in accordance with a movement of the cover 3 from the cover closed position (see FIG. 16) to the cover open position (see FIG. 15).

More specifically, the shutter driving member 100 includes an acted portion 101 in place of the acted portion 552 of the shutter driving member 55 in the above described first embodiment.

The acted portion 101 is located at the upstream end of the drawer 5 in the direction in which the drawer 5 moves from the drawn position to the accommodated position. The acted portion 101 is located at an upstream end of the shutter driving member 100 in the direction in which the drawer 5 moves from the drawn position to the accommodated position. The acted portion 101 extends in the first direction. The acted portion 101 extends from the upstream end of the shutter driving member 100 in the direction in which the drawer 5 moves from the drawn position to the accommodated position.

The cover 3 includes an acting portion 102. As illustrated in FIG. 16, in the state in which the drawer 5 is positioned at the accommodated position, the acting portion 102 is capable of acting on the acted portion 101. More specifically, in the state in which the drawer 5 is positioned at the accommodated position, the acting portion 102 is capable of coming into contact with the acted portion 101.

In the state in which the drawer 5 is positioned at the accommodated position, when the cover 3 moves from the cover open position to the cover closed position, the shutter driving member 100 moves from the first position to the second position while the acting portion 102 acts on the acted portion 101.

In the state in which the drawer 5 is positioned at the accommodated position, when the cover 3 moves from the cover closed position to the cover open position, the shutter driving member 100 moves from the second position to the first position while an act of the acting portion 102 on the acted portion 101 is released.

According to the modification, it is possible to close and open the shutters 67Y, 67M, 67C, 67K by utilizing a force of the user at a time when the user moves the cover 3.

Accordingly, it is possible to improve usability of the image forming apparatus.

What is claimed is:

1. An image forming apparatus, comprising:
   - a body housing having an opening;
   - a drawer movable through the opening between an accommodated position at which the drawer is accommodated in the body housing and a drawn position at which the drawer is drawn to a position outside the body housing;
   - a first drum cartridge mountable on the drawer and including:

a first photoconductive drum;

a first drum cleaner configured to collect waste toner from the first photoconductive drum;

a first discharging outlet through which the waste toner collected by the first drum cleaner is discharged; and a first shutter movable between a first closed position at which the first shutter closes the first discharging outlet and a first open position at which the first discharging outlet is open;

a first toner cartridge mountable on the first drum cartridge and capable of storing toner which is to be supplied to the first photoconductive drum;

a second drum cartridge mountable on the drawer and including:

a second photoconductive drum;

a second drum cleaner configured to collect waste toner from the second photoconductive drum;

a second discharging outlet through which the waste toner collected by the second drum cleaner is discharged; and a second shutter movable between a second closed position at which the second shutter closes the second discharging outlet and a second open position at which the second discharging outlet is open; and a second toner cartridge mountable on the second drum cartridge and capable of storing toner which is to be supplied to the second photoconductive drum, wherein the drawer includes:

a waste toner tube through which the waste toner is allowed to pass, the waste toner tube having (i) a first waste-toner-inlet through which the waste toner discharged from the first discharging outlet of the first drum cartridge mounted on the drawer is received and (ii) a second waste-toner-inlet through which the waste toner discharged from the second discharging outlet of the second drum cartridge mounted on the drawer is received;

a shutter driving member movable with respect to the waste toner tube between a first position and a second position, the shutter driving member being positioned at the first position in at least a state in which the drawer is positioned at the drawn position, the shutter driving member causing the first shutter and the second shutter to move in accordance with a movement of the shutter driving member in a state in which the first drum cartridge and the second drum cartridge are mounted on the drawer, wherein, in a state in which the shutter driving member is positioned at the first position, the first shutter is positioned at the first closed position and the second shutter is positioned at the second closed position, and wherein, in a state in which the shutter driving member is positioned at the second position, the first shutter is positioned at the first open position and the second shutter is positioned at the second open position.

2. The image forming apparatus according to claim 1, wherein the drawer is movable in a first direction, and wherein the first photoconductive drum and the second photoconductive drum are arranged in the first direction in the state in which the first drum cartridge and the second drum cartridge are mounted on the drawer.

3. The image forming apparatus according to claim 2, wherein the drawer includes a first side plate supporting the waste toner tube, and a second side plate spaced apart from the first side plate in a direction intersecting the first direction, and wherein the shutter driving member is supported by the first side plate.

4. The image forming apparatus according to claim 2, wherein the drawer includes a first side plate supporting the first drum cartridge and the second drum cartridge in the state in which the first drum cartridge and the second drum cartridge are mounted on the drawer and a second side plate spaced apart from the first side plate in a direction intersecting the first direction, the second side plate supporting the first drum cartridge and the second drum cartridge in the state in which the first drum cartridge and the second drum cartridge are mounted on the drawer, wherein the shutter driving member is supported by the first side plate such that the shutter driving member is movable with respect to the first side plate in the first direction.

5. The image forming apparatus according to claim 4, wherein the shutter driving member moves with respect to the first side plate in the first direction in accordance with a movement of the drawer between the accommodated position and the drawn position.

6. The image forming apparatus according to claim 4, wherein the first shutter moves between the first closed position and the first open position in accordance with a movement of the shutter driving member with respect to the first side plate in the first direction, and wherein the second shutter moved between the second closed position and the second open position in accordance with the movement of the shutter driving member with respect to the first side plate in the first direction.

7. The image forming apparatus according to claim 2, wherein the shutter driving member extends in the first direction and is movable in the first direction between the first position and the second position.

8. The image forming apparatus according to claim 7, wherein the shutter driving member moves from the first position to the second position in accordance with a movement of the drawer from the drawn position to the accommodated position and moves from the second position to the first position in accordance with a movement of the drawer from the accommodated position to the drawn position.

9. The image forming apparatus according to claim 8, wherein the shutter driving member includes an acted portion located at a downstream end of the drawer in a direction in which the drawer moves from the drawn position to the accommodated position, wherein the body housing includes an acting portion configured to act on the acted portion, wherein the shutter driving member moves from the first position to the second position by an act of the acting portion on the acted portion when the drawer moves from the drawn position to the accommodated position, and wherein the shutter driving member moves from the second position to the first position by a release of the act of the acting portion on the acted portion when the drawer moves from the accommodated position to the drawn position.

10. The image forming apparatus according to claim 1, further comprising a cover movable between a cover closed position at which the cover closes the opening and a cover open position at which the opening is open, wherein, in a state in which the drawer is positioned at the accommodated position, the shutter driving member moves from the first position to the second position in accordance with a movement of the cover from the cover open position to the cover closed position and moves from the second position to the first position in accordance with a movement of the cover from the cover closed position to the cover open position.

11. The image forming apparatus according to claim 10, wherein the cover includes an acting portion, wherein the shutter driving member includes an acted portion on which the acting portion acts, wherein, in the state in which the drawer is positioned at the accommodated position, the shutter driving member moves from the first position to the second position by an act of the acting portion on the acted portion when the cover moves from the cover open position to the cover closed position, and wherein, in the state in which the drawer is positioned at the accommodated position, the shutter driving member moves from the second position to the first position by a release of the act of the acting portion on the acted portion when the cover moves from the cover closed position to the cover open position.

12. The image forming apparatus according to claim 1, wherein the drawer further includes a spring configured to urge the shutter driving member in a direction directed from the second position toward the first position of the shutter driving member.

13. The image forming apparatus according to claim 1, wherein the drawer includes:

a first waste toner shutter movable between a first waste toner closed position at which the first waste toner shutter closes the first waste toner inlet and a first waste toner open position at which the first waste toner inlet is open; and a second waste toner shutter movable between a second waste toner closed position at which the second waste toner shutter closes the second waste toner inlet and a second waste toner open position at which the second waste toner inlet is open, wherein the first waste toner shutter includes a first gear, wherein the second waste toner shutter includes a second gear, and wherein the shutter driving member includes a first ruck portion configured to mesh with the first gear and a second ruck portion configured to mesh with the second gear.

14. The image forming apparatus according to claim 1, further comprising a waste toner storage storing the waste toner, and wherein the waste toner tube is connected to the waste toner storage in a state in which the drawer is positioned at the accommodated position, and the waste toner tube is spaced apart from the waste toner storage in a state in which the drawer is positioned at the drawn position.

15. The image forming apparatus according to claim 14, wherein the drawer further includes a conveying member located in the waste toner tube and configured to convey the waste toner in the waste toner tube toward the waste toner storage in the state in which the drawer is positioned at the accommodated position.

* * * * *